(12) United States Patent
Tran

(10) Patent No.: US 11,467,841 B1
(45) Date of Patent: Oct. 11, 2022

(54) MICROPROCESSOR WITH SHARED FUNCTIONAL UNIT FOR EXECUTING MULTI-TYPE INSTRUCTIONS

(71) Applicant: ANDES TECHNOLOGY CORPORATION, Hsinchu (TW)

(72) Inventor: Thang Minh Tran, Tustin, CA (US)

(73) Assignee: ANDES TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/335,089

(22) Filed: Jun. 1, 2021

(51) Int. Cl.
*G06F 9/38* (2018.01)

(52) U.S. Cl.
CPC .................... *G06F 9/3836* (2013.01)

(58) Field of Classification Search
CPC .............................. G06F 9/3836; G06F 9/3857
See application file for complete search history.

(56) References Cited

U.S. PATENT DOCUMENTS

| 5,996,064 | A | * | 11/1999 | Zaidi | ..................... | G06F 9/3855 712/216 |
| 6,148,395 | A | * | 11/2000 | Dao | ....................... | G06F 9/3851 712/23 |
| 6,725,354 | B1 | * | 4/2004 | Kahle | .................. | G06F 15/7832 712/E9.067 |
| 8,214,624 | B2 | * | 7/2012 | Berglas | ............... | G06F 9/30087 712/216 |
| 2011/0153991 | A1 | * | 6/2011 | Busaba | .................. | G06F 9/3867 712/214 |

FOREIGN PATENT DOCUMENTS

TW          I265406         11/2006

OTHER PUBLICATIONS

"Office Action of Taiwan Counterpart Application", dated Jun. 16, 2022, p. 1-p. 6.

* cited by examiner

*Primary Examiner* — Courtney P Carmichael-Moody
(74) *Attorney, Agent, or Firm* — JCIPRNET

(57) ABSTRACT

A microprocessor that includes a shared functional unit, a first execution queue and a second execution queue is introduced. The first execution queue includes a plurality of entries, wherein each entry of the first execution queue includes a first count value which is decremented until the first count value reaches 0. The first execution queue dispatches the first-type instruction to the shared functional unit when the first count value reaches 0. The second execution queue include a plurality of entries, wherein each entry of the second execution queue comprises a second count value which is decremented until the second count value reaches 0. The second execution queue dispatches the second-type instruction to the shared functional unit when the second count value reaches 0. The issue unit resolves all data dependencies and resource conflicts so that the first and second count values are preset for the first-type and second-type instructions to be mutually executed at the exact time in the future by the shared functional unit.

20 Claims, 11 Drawing Sheets

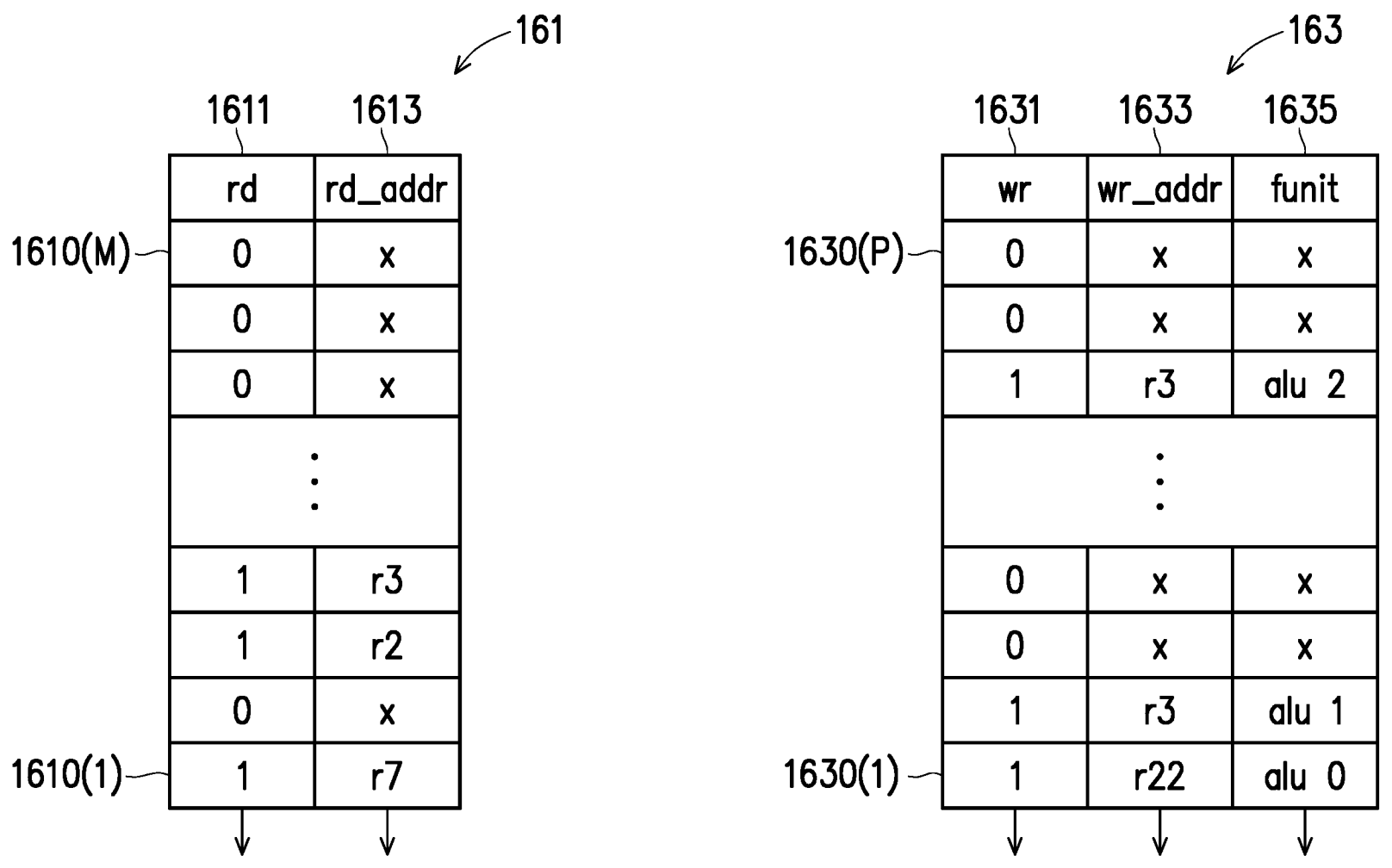

| 1631 | 1633 | 1635 |
|---|---|---|
| wr | wr_addr | funit |
| 0 | x | x |
| 0 | x | x |
| 1 | r3 | alu 2 |
| ... | ... | ... |
| 0 | x | x |
| 0 | x | x |
| 1 | r3 | alu 1 |
| 1 | r22 | alu 0 |

163

1630(P) (top row), 1630(1) (bottom row)

FIG. 5

| 1611 | 1613 |
|---|---|
| rd | rd_addr |
| 0 | x |
| 0 | x |
| 0 | x |
| ... | ... |
| 1 | r3 |
| 1 | r2 |
| 0 | x |
| 1 | r7 |

161

1610(M) (top row), 1610(1) (bottom row)

FIG. 4

MICROPROCESSOR WITH SHARED FUNCTIONAL UNIT FOR EXECUTING MULTI-TYPE INSTRUCTIONS

BACKGROUND

Technical Field

The disclosure generally relates to a microprocessor, and more specifically, to a microprocessor having a shared functional unit for executing multi-type instructions.

Description of Related Art

Superscalar microprocessors achieve high performance by executing multiple instructions per clock cycle and by out-of-order execution of instructions. The instructions must write back to the register file in-order to avoid the control hazards such as branch misprediction, interrupt, and precise exception. Temporary storages such as re-order buffer, register renaming are used to the result data until they can be retired in-order to the register file. Furthermore, storages are needed to keep the source operand data in execution queues until the instruction can be executed by the functional unit. These storages are often multiple times the size of the architectural register file and reading/writing of these storages consume much more power.

Metrics for design microprocessor including performance, power, and area (PPA) are hard to achieve when the microprocessor includes independent multi-type processing units such as a scalar floating-point unit (FPU) and vector processing unit (VPU). The VPU consists of both integer and floating-point (FP) arithmetic functions. The FP execution unit is much larger in size in comparison to the integer execution unit. Sharing of the execution units between different types of instruction could be very complicated especially in out-of-order execution microprocessor in dealing with different register files, data dependency, and result forwarding. The microprocessor may share the execution units by serializing the instruction types, i.e. the scalar FP instructions must be completed and clear out the execution units before the vector instructions can be sent to the execution unit. However, when instructions from both the multi-type processing units are allowed to be in an execution pipeline of the microprocessor, a performance of the microprocessor is limited.

SUMMARY

The disclosure introduces a microprocessor, t od and a data processing system that are capable of improving performance of the microprocessor with shared functional unit.

In some embodiments, the microprocessor includes a shared functional unit, a first execution queue, a second execution queue, a first-type issue unit, and a second-type issue unit. The first execution queue includes a plurality of entries, in which each entry of the first execution queue records a first-type instruction, each entry of the first execution queue includes a first count value corresponding to the first-type instruction, the first count value decrements until the first counter reaches 0. The first execution queue dispatches the first-type instruction to the shared functional unit when the first count value corresponding to the first-type instruction reaches 0. The second execution queue includes a plurality of entries, in which each entry of the second execution queue records a second-type instruction, each entry of the second execution queue includes a second count value corresponding to the second-type instruction, the second count value decrements until the second count value corresponding to the second-type instruction reaches 0. The second execution queue dispatches the second-type instruction to the shared functional unit when the second counter reaches 0. The shared functional unit executes the first-type instruction and the second-type instruction, wherein the first-type instruction from the first execution queue and the second type instruction from the second execution queue are mutually exclusive dispatched to the shared functional unit. The important distinction with prior arts in which the different types of instructions are dynamically selected for execution by the shared functional unit is the instructions are scheduled to be executed by the shared functional unit at the exact time in the future by using the preset counters (first count value and second count value). The reading and writing of data of the register files are preset to be synchronized for the exact execution time in the future of the shared functional unit for either the first-type instruction or the second-type instruction. No dynamic conflict resolution, no dynamic data dependency resolution, and no dynamic read/write ports resolution are needed as with prior-art. The dynamic resolutions are the most power consumption in microprocessor design.

In some embodiments, the method is adapted to a microprocessor comprising a first execution queue, a second execution queue, a shared functional unit. The method includes steps of dispatching a first-type instruction recorded in an entry of the first execution queue to the shared functional unit in response to determining that a first counter included in the entry of the first execution queue reaches 0; dispatching a second-type instruction recorded in an entry of the second execution queue to the shared functional unit in response to determining that a second counter included in the entry of the second execution reaches 0; and executing, by the shared functional unit, the first-type instruction and the second-type instruction.

In some embodiments, the data processing system includes a memory and a microprocessor, in which the memory is configured to store a first-type instruction and a second-type instruction. The microprocessor includes a shared functional unit, a first execution queue, a second execution queue, a first-type issue unit, and a second-type issue unit. The first execution queue includes a plurality of entries, in which each entry of the first execution queue records a first-type instruction, each entry of the first execution queue includes a first count value corresponding to the first-type instruction, the first count value decrements until the first counter reaches 0. The first execution queue dispatches the first-type instruction to the shared functional unit when the first count value corresponding to the first-type instruction reaches 0. The second execution queue includes a plurality of entries, in which each entry of the second execution queue records a second-type instruction, each entry of the second execution queue includes a second count value corresponding to the second-type instruction, the second count value decrements until the second counter reaches 0. The second execution queue dispatches the second-type instruction to the shared functional unit when the second counter reaches 0. The shared functional unit executes the first-type instruction and the second-type instruction, wherein the first-type instruction from the first execution queue and the second type instruction from the second execution queue are mutually dispatched to the shared functional unit. In another embodiment, the first execution queue and the second execution queue maybe merge into a single queue with a tag to indicate the type of instruction each entry of the queue. The single execution queue is more efficient but the two execution queues are easier for configuration.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a diagram illustrating a read shifter associated with a read port of the register file in accordance with some embodiments.

FIG. 5 is a diagram illustrating a write shifter associated with a write port of the register file in accordance with some embodiments.

DESCRIPTION OF THE EMBODIMENTS

Figure 1:
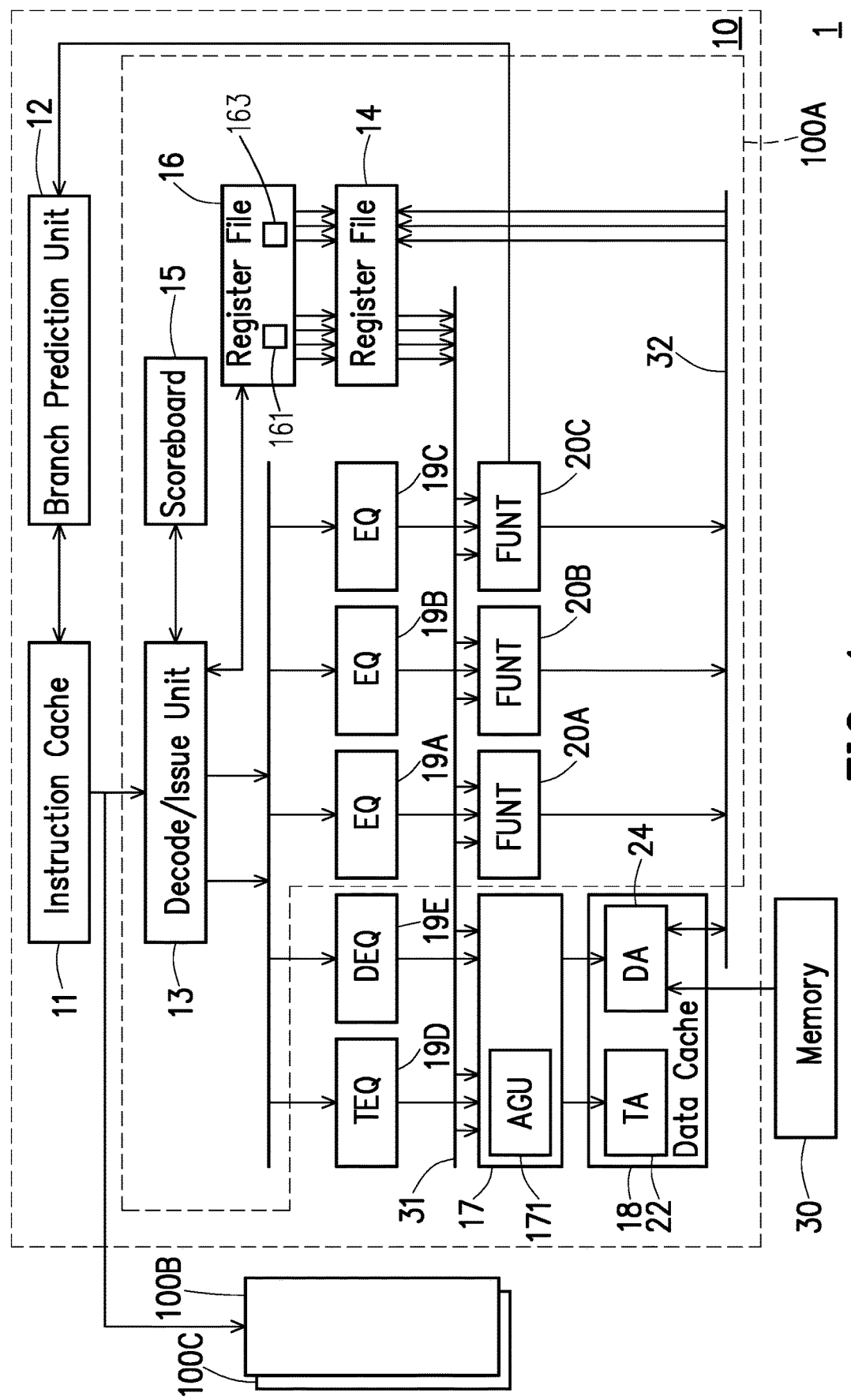
FIG. 1 is a block diagram illustrating a data processing system in accordance with some embodiments.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The disclosure introduces a microprocessor that schedules instructions to a future time for execution, rather than stalling a pipeline. Such processor may also be referred to as a future scheduling execution (FSE) microprocessor. Conventionally, if a register or a functional unit designated by an instruction is not ready (e.g., resource conflict such as data dependency, availability of read and write ports of the register, availability of the functional unit, etc.), the decode/issue unit would stall the execution pipeline or put aside the instruction until the availability of the register or functional unit resolved. In the FSE microprocessor, the decode/issue unit would still issue and schedule these instructions to a future time for execution based on resolving the data dependency, availability of the read and write ports of the register and functional unit at that future time.

Referring to FIG. 1A, a schematic diagram of a data processing system 1 including a microprocessor 10 and a memory 30 is illustrated in accordance with some embodiments. The microprocessor 10 is implemented to perform a variety of data processing functionalities by executing instructions stored in the memory 30. The memory 30 may include level 2 (L2) and level 3 (L3) caches and a main memory of the data processing system 1, in which the L2 and L3 caches has faster access times than the main memory. The memory may include at least one of random access memory (RAM), dynamic random access memory (DRAM), static random access memory (SRAM), read only memory (ROM), programmable read only memory (PROM), electrically programmable read only memory (EPROM), electrically erasable programmable read only memory (EEPROM), and flash memory.

The microprocessor 10 may be a superscalar microprocessor that implements an instruction-level parallelism within a single microprocessor. The superscalar microprocessor achieves high performance by executing multiple instruction per clock cycle. Multiple instructions are dispatched to different functional units for parallel execution. The superscalar microprocessor may employ out-of-order (OOO) execution, in which a second instruction without any dependency on a first instruction may be executed prior to the first instruction. In traditional out-of-order microprocessor design, the instructions can be executed out-of-order but they must retire to a register file of the microprocessor in-order because of control hazards such as branch misprediction, interrupt, and precise exception. Temporary storages such as re-order buffer and register renaming are used for the result data until the instruction is retired in-order from the execution pipeline. In this invention, the microprocessor 10 may execute and retire instruction out-of-order by write back result data out-of-order to the register file as long as the instruction has no data dependency and no control hazard. In the embodiments, no temporary register is used for this FSE microprocessor 10, since the microprocessor 10 is configured to issue an instruction having data dependency or control hazard by scheduling the instruction to a future time. However, the disclosure is not intended to limit thereto. In some other embodiments, temporary register may also be used.

Referring to FIG. 1A, the microprocessor 10 may include an instruction cache 11, a branch prediction unit (BPU) 12, a decode/issue unit 13, a register file 14, a scoreboard 15, a read/write control unit 16, a load/store unit 17, a data cache 18, a plurality of execution queues (EQs) 19A-19E where the execution queue may be used for special purpose such as a tag execution queue TEQ 19A and a data execution queue DEQ 19B, a plurality of functional units (FUNTs) 20A-20C. The microprocessor 10 also includes a read bus 31 and a result bus 32. The read bus 31 is coupled to the load/store unit 17, the functional units 20A-20C, and the register file 14 for transmitting operand data from registers in the register file 14 to the load/store unit 17 and the functional units 20A-20C, which may also be referred to as an operation of reading operation data (or store data in the case of store instruction) from the register file 14. The result bus 32 is coupled to the data cache 18, functional units 20A-20C, and the register file 14 for transmitting data from the data cache 18 or functional units 20A-20C to the registers of the register file 14, which may also be referred to as an operation of writeback result data (or load data in the case of load instruction) to the register file 14. Elements referred to herein with a particular reference number followed by a letter will be collectively referred to by the reference number alone. For example, execution queues 19A-19E will be collectively referred to as execution queues 19 unless specified. The decode/issue unit 13, the scoreboard 15, the read/write control unit 16, the register file 14, the plurality of execution queues 19, and the plurality of functional units 20 are grouped together in an execution block 100A for one type of instructions with data access through the same register file. In some embodiments, the microprocessor 10 may also execute other type of instructions such as vector or floating-point instructions as shown in execution blocks 100B and 100C which are collectively referred to herein as execution blocks 100. In some embodiments, the instructions may include instructions of different types. For example, the instructions may include at least one of vector instructions, scalar FP instructions, Single Instruction/Multiple Data (SIMD) instructions, digital signal processing (DSP) instructions, or any other type of instructions. The definitions of vector instructions, scalar FP instructions, SIMD instructions, DSP instructions are well-known in the related technical field, thus the detail descriptions about those instruction types are omitted hereafter. Some embodiments of the disclosure may use more, less, or different components than those illustrated in FIG. 1A.

In some embodiments, the instruction cache 11 is coupled (not shown) to the memory 30 and the decode/issue unit 13, and is configured to store instructions that are fetched from the memory 30 and dispatch the instructions to the decode/issue unit 13. The instruction cache 11 includes many cache lines of contiguous instruction bytes from memory 30. The cache lines are organized as direct mapping, fully associative mapping or set-associative mapping, and the likes. The direct mapping, the fully associative mapping and the set-associative mapping are well-known in the relevant art, thus the detailed description about the above mappings are omitted hereafter.

The instruction cache 11 may include a tag array (not shown) and a data array (not shown) for respectively storing a portion of the address and the data of frequently-used instructions that are used by the microprocessor 10. Each tag in the tag array is corresponding to a cache line in the data array. When the microprocessor 10 needs to execute an instruction, the microprocessor 10 first checks for an existence of the instruction in the instruction cache 11 by comparing address of the instruction to tags stored in the tag array. If the instruction address matches with one of the tags in the tag array (i.e., a cache hit), then the corresponding cache line is fetched from the data array. If the instruction address does not match with any entry in the tag array, then it is cache miss, the microprocessor 10 may access the memory 30 to find the instruction. In some embodiments, the microprocessor 10 further includes an instruction queue (not shown) that is coupled to the instruction cache 11 and the decode/issue unit 13 for storing the instructions from the instruction cache 11 or memory 30 before sending the instructions to the decode/issue unit 13.

The BPU 12 is coupled to the instruction cache 11 and is configured to speculatively fetch instructions subsequent to branch instructions. The BPU 12 may provide prediction to branch direction (taken or not taken) of branch instructions based on the past behaviors of the branch instructions and provide the predicted branch target addresses of the taken branch instruction. The branch direction may be "taken", in which subsequent instructions are fetched from the branch target addresses of the taken branch instruction. The branch direction may be "not taken", in which subsequent instructions are fetched from memory locations consecutive to the branch instruction. In some embodiments, the BPU 12 implements a basic block branch prediction for predicting the end of a basic block from starting address of the basic block. The starting address of the basic block (e.g., address of the first instruction of the basic block) may be the target address of a previously taken branch instruction. The ending address of the basic block is the instruction address after the last instruction of the basic block which may be the starting address of another basic block. The basic block may include a number of instructions, and the basic block ends when a branch in the basic block is taken to jump to another basic block.

The functional units may include a branch execution unit (BEU) (which may be one of the functional units 20) that may execute the branch instruction and determine if the predicted branch direction is incorrect (misprediction). For example, the BEU may compare the predicted branch direction (taken or not taken) to actual branch executed to determine if the predicted branch direction is correct. The instructions subsequent to the mis-predicted branch are discarded from various units in the microprocessor. The branch misprediction may be also from the decode/issue unit 13 to decode unconditional branch instructions (always taken branches) which were not predicted by BPU 12. The decode/issue unit 13 and the BPU 12 may provide update information to the BPU 12. In the microprocessor 10, the instructions after the branch instruction must not write back to the register file 14 until after the execution of the branch instruction.

The decode/issue unit 13 may decode the instructions received from the instruction cache 11. The instruction may include the following fields: an operation code (or opcode), operands (e.g., source operands and destination operands), and an immediate data. The opcode may specify which operation (e.g., ADD, SUBTRACT, SHIFT, STORE, LOAD, etc) to carry out. The operand may specify the index or address of a register in the register file 14, where the source operand indicates a register from the register file from which the operation would read, and the destination operand indicates a register in the register file to which result data of the operation would write back. It should be noted that the source operand and destination operand may also be referred to as source register and destination register, which may be used interchangeably hereinafter. In some embodiments, the operand would need 5-bit index to identify a register in a register file that has 32 registers. Some instructions may use the immediate data as specified in the instruction instead of the register data. Each operation would be executed in a functional unit 20 or the load/store unit 17. Based on the type of operation specified by the opcode and availability of the resources (e.g., register, functional unit, etc.), each instruction would have an execution latency time and a throughput time. The execution latency time (or latency time) refers to the amount of time (i.e., the number of clock cycles) for the execution of the operation specified by the instruction(s) to complete and writeback the result data. The throughput time refers to the amount of time (i.e., the number of clock cycles) when the next instruction can enter the functional unit 20.

In the embodiments, instructions are decoded in the decode/issue unit 13 for the execution latency times, the throughput times, and instruction types based on the opcode. The instructions are dispatched to the execution queues 19 to be executed by the functional units 20 or load/store unit 17. Multiple instructions may be issued to one execution queue 19 where the throughput times are accumulated. The accumulated time indicates when the next instruction can enter the functional unit 20 for execution in view of the previously issued instruction(s) in the execution queue 19. The time of when the instruction can be sent to the functional unit 20 is referred to as read time (from the register file), and the time of when the instruction is completed by the functional unit 20 is referred to as the write time (to the register file). The instructions are issued to the execution queues 19 where each issued instruction has the scheduled read time to dispatch to the functional units 20 or load/store unit 17 for execution. The accumulated throughput time is the read time of the issuing instruction. The instruction latency time of the instruction is added to the accumulated throughput to generate the write time when the instruction is issued to the next available entry of the execution queue 19. The accumulated time modifies the latency execution time and the start time of the issuing instruction. The modified execution latency time would be referred to herein as a write time of the most recent issued instruction, and the modified start time would be referred to herein as the read time of an issued instruction. The write time and read time may also be referred to as an access time which describes a particular time point for the issued instruction to write to or read from a register of the register file 14. For parallel issuing of more than one instruction, the write time and read time of the second instruction may be further adjusted based on the first instruction(s) which was issued prior to the second instruction. The decode/issue unit 13 may decode a load/store instruction as two micro operations (micro-ops) including a tag micro-op and a data micro-op.

In some embodiments, the decode/issue unit 13 checks and resolves all possible conflicts before issuing the instruction. An instruction may have the following 4 basic types of conflicts: (1) data dependency which includes write-after-read (WAR), read-after-write (RAW), and write-after-write (WAW) dependencies, (2) availability of read port to read data from the register file to the functional unit, (3) availability of the write port to write back data from the functional unit to the register file, and (4) the availability of the functional unit 160 to execute data. The decode/issue unit 13 may access the scoreboard 15 to check data dependency before the instruction can be dispatched to the execution queue 19. The register file 14 has limited number of read and write ports where the issued instructions must arbitrate or reserve the read and write ports to access the register file 14 in future times. The read/write control unit 16 keeps the scheduled read time for each source operand of an instruction and the scheduled write time for each destination operand of an instruction. The decode/issue unit 13 may access the read/write control unit 16 to check availability of the read ports of the register file 14, as to schedule the access time (i.e., read and write times) of the instruction. In other embodiments, one of the write ports may be dedicated for instruction with unknown execution latency time to write back to the register file 14 without using the write port control, and one of the read ports may be reserved for instructions with unknown read time to read data from the register file 14 without using the read port control. The number of read ports of the register file 14 can be dynamically reserved (not dedicated) for the unknown read operations. In this case, the functional unit 20 or the load/store unit 17 must ensure that the read port is not busy when trying to read data from the register file 14. In the embodiments, the availability of the functional unit 20 may be resolved by coordinating with the execution queue 19 where the throughput times of queued instructions (i.e., previously issued to the execution queue) are accumulated. Based on the accumulated throughput time in the execution queue, the instruction may be dispatched to the execution queue 19, where the instruction may be scheduled to be issued to the functional unit 20 at a specific time in the future at which the functional unit 20 is available.

Figure 2:
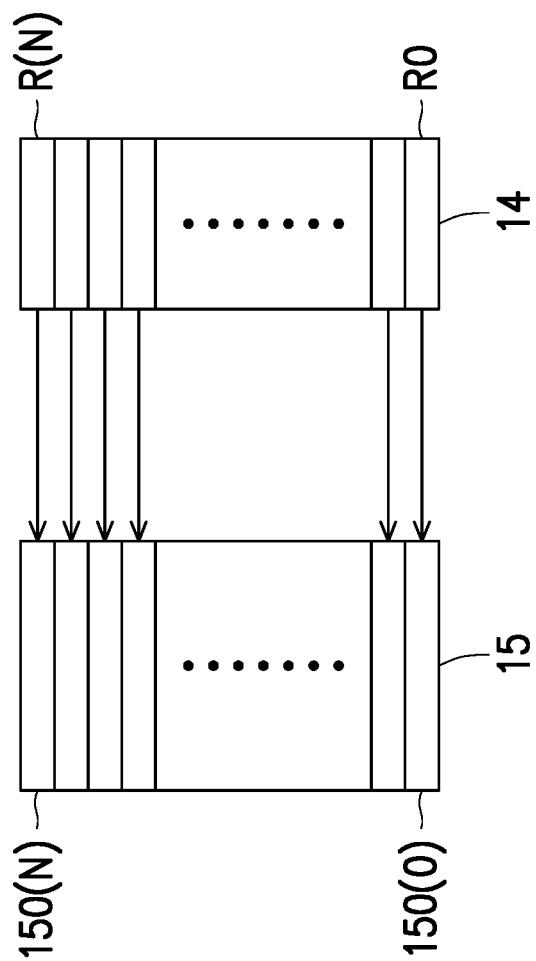
FIG. 2 is a diagram illustrating a scoreboard and a register file in accordance with some embodiment.

FIG. 2 is a block diagram illustrating a register 14 and a scoreboard 15 in accordance with some embodiments of the disclosure. The register file 14 may include a plurality of registers R(0)-R(N), read ports and write ports (not shown), where N is an integer greater than 1. In the embodiments, the register file 14 may include a scalar register file and a vector register file. The disclosure is not intended to limit the number of registers, read ports and write ports in the register file 14. The scoreboard 15 includes a plurality of entries 150(0)-150(N), and each scoreboard entry corresponds to one register in the register file 14 and records information related to the corresponding register. In some embodiments, the scoreboard 15 has the same number of entries as the register file 14 (i.e., N number of entries), but the disclosure is not intended to limit the number of the entries in the scoreboard 15.

Figure 3A:
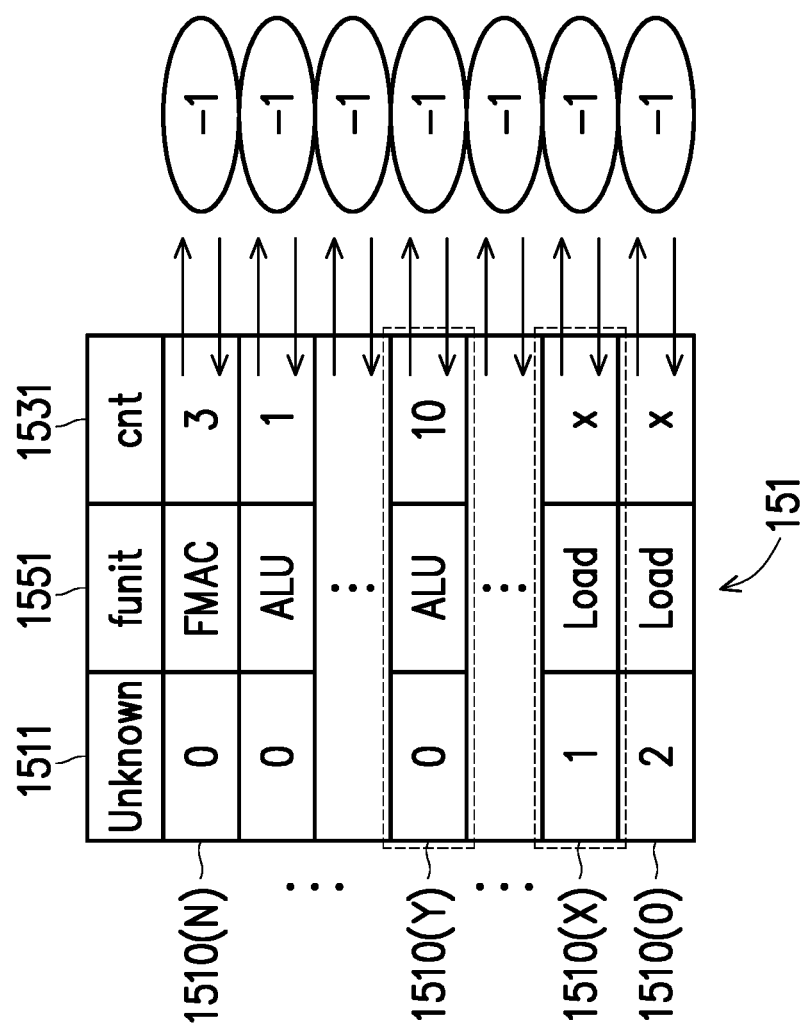
FIGS. 3A-3B are diagrams illustrating various structures of a scoreboard entry in accordance with some embodiments.
Figure 3B:
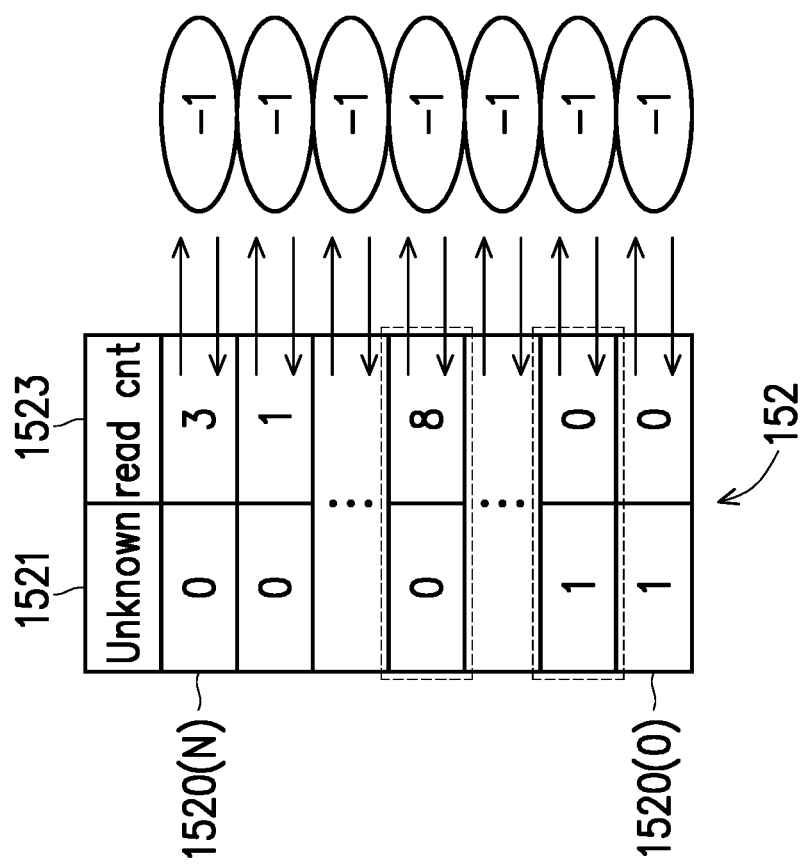

FIGS. 3A-3B are diagrams illustrating various structures of a scoreboard entry in accordance with some embodiments of the disclosure. In the embodiments, the scoreboard 15 may include a first scoreboard 151 for handling writeback operation to the register file 14 and a second scoreboard 152 for handling read operation from the register file 14. The first and second scoreboards 151, 152 may or may not coexist in the microprocessor 10. The disclosure is not intended to limit thereto. In other embodiments, the first and second scoreboards 151, 152 may be implemented or view as one scoreboard 15 that handles both read and write operations. FIG. 3A illustrates a first scoreboard 151 for the destination register of the issued instruction. FIG. 3B illustrates a second scoreboard 15 for the source registers of the issued instruction. With reference to FIG. 3A, each entry 1510(0)-1510(N) of the first scoreboard 151 includes an unknown field ("Unknown") 1511, a count field ("CNT") 1513 and a functional unit field ("FUNIT") 1515. Each of these fields records information related to the corresponding destination register that is to be written by issued instruction(s). These fields of the scoreboard entry may be set at a time of issuing an instruction.

The unknown field 1511 includes a bit value that indicates whether the write time of a register corresponding to the scoreboard entry is known or unknown. For example, the unknown field 1511 may include one bit, where a non-zero value indicates that the register has unknown write time, and a zero value indicates that the register has known write time as indicated by the count field 1513. In some embodiments, the unknown field 1511 may include any number of bits to indicate that one or more issued instruction(s) with unknown write time is scheduled to write the register. The unknown field 1511 may be set or modified at the issue time of an instruction and reset after the unknown register write time is resolved. The reset operation may be performed by either the decode/issue unit 13, a load/store unit 17 (e.g., after a data hit), or a functional unit 20 (e.g., after INT DIV operation resolve the number of digits to divide), and other units in the microprocessor that involves execution of instruction with unknown write time. In some embodiments, the unknown field 1511 may include two bits, which would have 4 different states that records the existence of three other issued instructions with unknown write time being scheduled to write the register. In yet some other embodiments, the unknown field 1511 may include three bits, four bits, and so on to record a plurality of issued instructions with unknown write time.

The count field 1513 records a count value that indicates the number of clock cycles before the register can be written by the next instruction (that is to be issued), which may also be referred to as write count field recording write count value. In other words, the count field 1513 records the number of clock cycles for which the previously issued instruction(s) would complete the operation and writeback the result data to the register. The count value of the count field 1513 is set based on the execution latency time at the issue time of the instruction. Then, the count value counts down (i.e., decrement by one) for every clock cycle until the count value become zero (i.e., a self-reset counter). For example, the execution latency time of an ADD instruction is 2 clock cycles, and the count value in the count field 1513 would be set to 2 at the issue time of the ADD instruction for the destination register and self-reset when the counter field reaches 0. The count value of 3 indicates that the result data would be written back to the register corresponding to the scoreboard entry in 3 clock cycles later, a count value of 1 indicates that the result data would be written back to the register in next clock cycle, and a count value of 0 indicates that there is no data dependency for accessing the register. In the embodiments, the issued instruction may write to or read from the register. In a case of writing to the register, the value of count field 1513 may be referred to as a write (or latency) count value. In a case of reading to the register, the value of count field 1513 may be referred to as a read count value which would be discussed in FIG. 3B. In other words, in some other embodiments, the count value field may record either the write time or read time of the register depending on the operation designated by the issued instruction.

The functional unit field 1515 of the scoreboard entry specifies a functional unit 20 (designated by the issued instruction) that is to write back to the register. For example, the functional unit field 1515 that records ALU indicates that the result data will be written back from an ALU function unit to the register. In some embodiments, the recorded functional unit in the functional unit field 1515 may be used to forward the result data from the recorded functional unit to another functional unit designated by the next instruction when the count field 1513 reaches a value of 1.

FIG. 3B is a diagram illustrating a structure of a scoreboard entry in accordance with some embodiments of the disclosure. The second scoreboard 152 having the structure of scoreboard entry 1520(0)-1520(N) is designed to resolve a conflict in writing to a register corresponding to a scoreboard entry before an issued instruction read from the register. The second scoreboard may also be referred to as a WAR scoreboard for resolving WAR data dependency. Each of the scoreboard entry 1520(0)-1520(N) includes an unknown field 1521 and a count field (may also be referred to as the count field) 1523. The functional unit field may be omitted in the implementation of the WAR scoreboard. The unknown field 1521 includes a bit value that indicates whether the read time of a register corresponding to the scoreboard entry is known or unknown. The operation and the functionality of the unknown field 1521 is similar to the unknown field 1511, and therefore, the detail of which is omitted for the purpose of brevity. The count field 1523 records a read count value that indicates the number of clock cycles for which the previously issued instruction(s) would take to read from the corresponding register. The count field 1523 may also be referred to as the read count field that stores the read count value. Similar to the write count value of the (write) count field 1513, the read count value counts down by one for every clock cycle until the read count value reaches 0. The operation and functionality of the (read) count field 1523 is similar to the (write) count field 1513 unless specified, and thus the detail of which is omitted.

The read/write control unit 16 is configured to record the availability of the read ports and/or the write ports of the register file 14 at a plurality of clock cycles in the future for scheduling the access of instruction(s) that is to be issued. At time of issuing an instruction, the decode/issue unit 13 access the read/write control unit 16 to check availability of the read ports and/or the write ports of the register file 14 based on the access time specified by the instruction. In detail, the read/write control unit 16 selects available read port(s) in a future time as a scheduled read time to read source operands to the functional units 20, and selects available write port(s) in a future time as a scheduled write time to write back result data from the functional units 20. In the embodiments, the read/write control unit 16 may include a read shifter 161 and a write shifter 163 for scheduling the read port and the write port as described above.

FIG. 4 is a diagram illustrating a read shifter 161 associated with a read port of the register file in accordance with some embodiments of the disclosure. FIG. 5 is a diagram illustrating a write shifter 163 associated with a write port of the register file in accordance with some embodiments of the disclosure. Each of the read ports of the register file 14 may be associated with one read shifter 161, and each of the write ports of the register file 14 may be associated with one write shifter 163. In the embodiments, the read shifter(s) 161 and the write shifter(s) 163 may be included in the read/write control unit 16. However, the disclosure is not limited thereto. In some other embodiments, the read shifter(s) 161 and the write shifter(s) 163 may be external to the read/write control unit 16, where the read/write control unit 16 may be communicatively coupled to the read shifter(s) 161 and the write shifter(s) 163, respectively, for controlling the usage of the read ports and write ports of the register file 14.

With reference to FIG. 4, the read shifter 161 includes a plurality of entries 1610(1)-1610(M), in which each entry may include a read valid field 1611 and an address field 1613, where M is an integer greater than 1. Each of the entries 1610(1)-1610(M) is associated with one clock cycle in the future and records the availability of the corresponding read port in that clock cycle. For example, the entry 1610(1) indicates the availability of the read port in the first upcoming clock cycle (i.e., immediate next clock cycle), and the entry 1610(M) indicates the availability of the read port in the Mth clock cycle in the future. With reference to FIG. 4, the bottommost entry of the entries 1610(1)-1610(M) would be shifted out for every clock cycle, and a new entry may be added as 1610(M). For example, the bottommost entry 1610(1) would be shifted out in the immediate next clock cycle. In the embodiments, the read valid field 1611 records a read valid value ("rd") that indicates the availability of a read port in the corresponding clock cycle. For example, a non-zero value in the read valid field 1611(X) in a Xth entry indicates that the read port would be busy at the Xth clock cycle in the future, where X is greater than 1 and less than M. A zero value in the read valid field 1611(X) in the Xth entry indicates that the corresponding read port would be free for access at the Xth clock cycle in the future. The address field 1613 records an address ("rd_addr") of a register from which data is to be read. For example, the entry 1610(1) indicates that the corresponding read port would be busy at the immediate next clock cycle for reading data from register 7 (i.e., address "r7"). In some alternative embodiments, there are more or fewer fields in each entry of the read shifter 161 for recording other information.

At the issue time of an instruction, the decode/issue unit 13 checks the read/write control unit 16 for the availability of the read port(s) of the register file 14 at the read time of the instruction. For example, the read time is X clock cycles. The read/write control unit 16 checks the Xth entry of the read shifter(s) 161 to determine whether a read port is free at the Xth clock cycle in the future. If the number of available read ports is greater than or equal to the number of needed read ports of the instruction at the read time, then the decode/issue unit 13 may issue and schedule the instruction for execution at the Xth clock cycle (i.e., the scheduled read time). The read valid field 1611 and the read address 1613 of the read port are set for each valid source register of the issued instruction. If the number of the of available read ports is less than the number of needed read ports, then the decode/issue unit 13 may stall the instruction and re-check the read shifter(s) in next clock cycle. At the scheduled read time, the read shifter(s) provides the read valid rd and the register address rd_addr to the corresponding functional unit for reading data from the register file 14. In an embodiment, the shift register 161 may be implemented with rotating read pointer where the read pointer indicates the bottom of the shift register 161 to read the valid bit 1611 and the register address 1613 every clock cycle and the read pointer is incremented every clock cycle.

With reference to FIG. 5, the write shifter 163 (may be referred to as a latency shifter) includes a plurality of entries 1630(1)-1630(P), in which each entry includes a writeback valid field ("wr") 1631, a write address field ("wr_addr") 1633 and a functional unit field ("funit") 1635, where P is an integer greater than 1. Each of the entries 1630(1)-1630(P) is associated with one clock cycle in the future and records availability of the corresponding write port in that clock cycle. For example, the entry 1630(1) indicates the availability of the write port in the first upcoming clock cycle (i.e., immediate next clock cycle), and the entry 1630(P) indicates a status of the write port in the Nth clock cycle in the future. With reference to FIG. 5, the bottommost entry of the entries 1630(1)-1630(P) would be shifted out for every clock cycle. For example, the bottommost entry 1630(1) would be shifted out in the immediate next clock cycle, and a new entry may be added as 1630(P). In the embodiments, the writeback valid field 1631 records a writeback valid value ("wr") that indicates the availability of the write port at a clock cycle corresponding to the entry. For example, a non-zero value in the writeback valid field 1631(Y) in a Yth entry indicates that the write port would be busy at the Yth clock cycle in the future, where Y is greater than 1 and less than P. A zero value in the read value field 1631(Y) in the Yth entry indicates that the write port would be free for access at the Yth clock cycle in the future. The write address field 1633 indicates an address ("wr_addr") of a register in the register file 14 to which a functional unit writes back the result data. The functional unit field 1635 specifies the functional unit 20 or load/store unit 17 ("funit") that would write back the result data to the write port. For example, the first entry 1630(1) of the write shifter 163 indicates that the write port would be busy in the first upcoming clock cycle, where ALU 0 recorded in the functional field 1635 would write back result data to the register 22 ("r22") recorded in the write address field 1633.

At the issue time of an instruction, the decode/issue unit 13 checks the read/write control unit for the availability of the write port(s) of the register file 14 at the write time of the instruction before issuing the instruction. For example, the write time is Y clock cycles. The read/write control unit 16 checks the Yth entry of the write shifter(s) 163 to determine whether the write port(s) is free at the Yth clock cycle in the future. If the number of available write ports is greater than or equal to the number of needed write ports of the instruction at the write time, then the decode/issue unit 13 may issue and schedule the instruction for execution completion at the Yth clock cycle (i.e., the scheduled write time). The writeback valid field 1631, the functional unit 1635 and the destination address 1633 are set for each valid destination register of the issued instruction. If the number of the of available write ports is less than the number of needed write ports, then the decode/issue unit 13 may stall the instruction and re-check the write shifter(s) in next clock cycle. At the scheduled write time, the read/write port control grabs the result data from the functional unit 20 as recorded in the functional unit field 1635 and write the result data to the register as specified in the write address field 1633. In an embodiment, the write shifter 163 may be implemented with rotating read pointer where the read pointer indicates the bottom of the write shifter 163 to read the valid bit 1631, the register address 1633, and the functional unit 1635 every clock cycle and the read pointer is incremented every clock cycle.

With reference to FIG. 1, the execution queues 19 are configured to hold issued instructions which are scheduled to be dispatched to the functional units 20. The functional unit 20 may include, but not limited to, integer multiply, integer divide, an arithmetic logic unit (ALU), a floating-point unit (FPU), a branch execution unit (BEU), a unit that receive decoded instructions and perform operations, or the like. In the embodiments, each of the execution queues 19 are coupled to or dedicated to one of the functional units 20. For example, the execution queue 19A is coupled between the decode/issue unit 13 and the corresponding functional unit 20A to queue and dispatch the instruction(s) that specifies an operation for which the corresponding functional unit 20A is designed. Similarly, the execution queue 19B is coupled between the decode/issue unit 13 and the corresponding functional unit 20B, and the execution queue 19C is coupled between the decode/issue unit 13 and the corresponding functional unit 20C. In the embodiments, the execution queues 19D, 19E are coupled between the decode/issue unit 13 and the load/issue unit 17 to handle the load/store instructions. The execution queues 19D, 19E may also be referred to as a Tag-Execution Queue (TEQ) 19D and Data-Execution Queue (DEQ) 19E, respectively.

Figure 6:
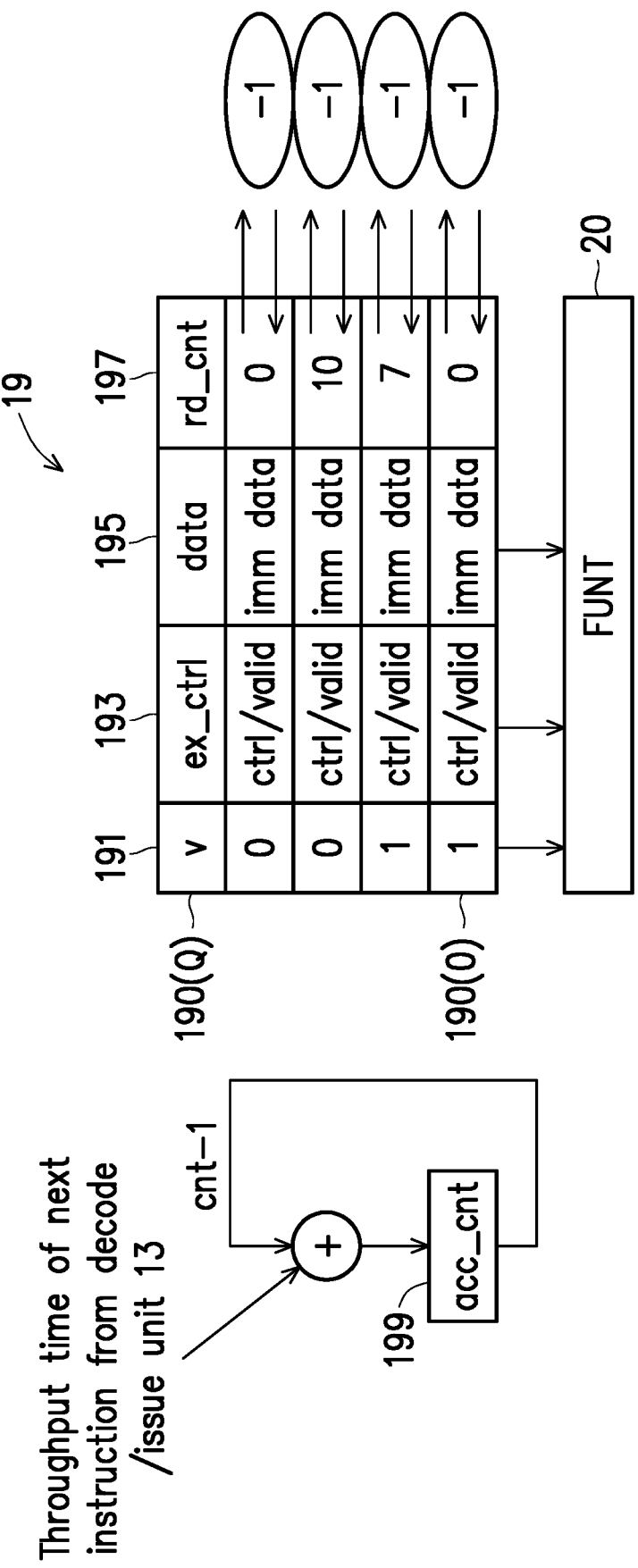
FIG. 6 is a diagram illustrating an execution queue in accordance with some embodiments.

FIG. 6 is a diagram illustrating an execution queue 19 in accordance with some embodiments. The EQ 19 may include a plurality of entries 190(0)-190(Q) for recording information about instructions issued from the decode/issue unit 13 in an order that is to be sent to the functional unit 20, where Q is an integer greater than 0. In an example, each entry of the execution queue 19 includes a valid field 191, an execution control data field 193, a data field 195 and a read count field 197 which are labeled in FIG. 1F as "v", "ex_ctrl", a "data", and a "rd_cnt", respectively. In other embodiments, there may be more or fewer fields which are recorded in each EQ and the data field 195 may have other data instead of immediate data.

The valid field 191 indicates whether an entry is valid or not (e.g., valid entry is indicated by "1" and invalid entry is indicated by "0"). The execution control data field 193 and the data field 195 indicate an execution control information for the functional unit 20 and immediate data of the instruction, which are derived from the instruction. The read count field 197 records a read count rd_cnt for indicating a read time of the instruction. The read time stored in the read count field 197 is counted down by one every clock cycle until the read count rd_cnt becomes zero. When the read time in the read count field 197 is 0, the execution queue 19 dispatches the valid instruction to the functional unit 20.

The execution queue 19 may include or couple to an accumulate counter 199 for storing an accumulate count value acc_cnt that is counted down by one every clock cycle until the counter value become zero. The accumulative count of zero indicates that the EQ 19 is empty. The accumulate count value acc_cnt of accumulate counter 199 indicates the time in the future when the next instruction in decode/issue unit 13 can be dispatched to the functional units 20 or the load/store unit 17. The next instruction in decode/issue unit 13 can be issued to the execution queue 19 with a scheduled dispatched time to the functional unit 20 or the load/store unit 17 according to the accumulate count value of the accumulate counter 199. In some embodiments, the read time of the instruction is the accumulate count value and the accumulate count value is set according to the sum of current acc_cnt and the instruction throughput time (acc_cnt=acc_cnt+inst_xput_time) for the next instruction. In some other embodiments, the read time is modified (in which read time is greater than the current accumulate count) and the accumulate count value acc_cnt is set according to a sum of a read time (rd_cnt) of the instruction and a throughput time of the instruction (acc_cnt=rd_cnt+inst_xput_time) for the next instruction. The read shifters 161 and the write shifters 163 are designed to be in synch with the execution queue 19 such that execution queue 19 may dispatch the instruction to the functional unit 20 or load/store unit 17 at the same time as the source registers are read from the register file 14 according to the read shifters 161, and the result data from the functional unit 20 or the load/store unit 17 are written back to the register file 14 according to the write shifters 163.

With reference to FIG. 1, the load/store unit 17 is coupled to the decode/issue unit 13 to handle load instruction and store instruction. In the embodiments, the decode/issue unit 13 issues the load/store instruction as two micro operations (micro-ops) including a tag micro-op and a data micro-op. The tag micro-op is sent to a Tag-Execution Queue (TEQ) 19D and the data micro-op is sent to Data-Execution Queue (DEQ) 19E. In some embodiments, the throughput time for micro-ops of the load/store instruction is 1 cycle; the TEQ 19D and DEQ 19E are independent processed load/store operations; and the TEQ 19D must issue the tag operation before the DEQ 19E issues the data operation.

The data cache 18 is coupled to the memory 30 and the load/store unit 17, and is configured to store data that are fetched from the memory 30 and accessed for load/store data by the load/store unit 17. The data cache 18 includes many cache lines of contiguous data bytes from memory 30. The cache lines of data cache 18 are organized as direct mapping, fully associative mapping or set-associative mapping similar to the instruction cache 11 but not necessary the same mapping as with the instruction cache 11.

The data cache 18 may include a tag array (TA) 22 and a data array (DA) 24 for respectively storing a portion of the address and the data of frequently-used data that are used by the microprocessor 10. Similar to the instruction cache 11, each tag in the tag array 22 is corresponding to a cache line in the data array 24. When the microprocessor 10 needs to execute the load/store instruction, the microprocessor 10 first checks for an existence of the load/store data in the data cache 18 by comparing the load/store address to tags stored in the tag array 22. If the load/store address matches with one of the tag in the tag array (cache hit), then the corresponding cache line in the data array 24 is accessed for load/store data. In some embodiment, the load instruction fetches the data from a cache line of the data array 24 to write to a destination register of the register file 16 while the store instruction writes the data from a source register of the register file 16 to a cache line in the data array 24. If the load/store address does not match with any entry in the tag array 22, then it is cache miss and the microprocessor 10 may access the memory 30 to find the data. In case of cache hit, the execution latency of the load/store instruction is known (e.g, 2, 3, 6, or any number of clock cycles). In case of cache miss, the execution latency of the load/store instruction is 15 clock cycles or more. The execution latency for load instruction is basically unknown depended on cache hit and the latency of the memory 30.

The tag operation includes calculation of the address by the address generation unit (AGU) 21 in the load/store unit 17 and using the calculated address to access the tag array 22 and the data translation look-aside buffer (TLB) (not shown) for virtual to physical address translation. The address calculation is the addition operation of a source register from the register file 14 and immediate data ("imm data") from the data field 195 of FIG. 6. The read shifter 161 of FIG. 4 is scheduled to read the source register from the register file 14 to match with dispatching of the tag operation from TEQ 19D to AGU 171. In some embodiments, the virtual address and physical address are the same in which case the data TLB is not needed. The TEQ 19D dispatches the tag operation to an address generation unit (AGU) 171 of the load/store unit 17 to calculate a load/store address. The load/stored address is used to access a tag array (TA) 22 of the data cache 18. The cache hit/miss and the hit way (set associative mapping) are kept in order to be accessed by the DEQ 19E where the data operation accesses a cache line of the hit way in the DA 24. For load instruction, if the DA 24 is accessed in concurrent with the TA 22, then all ways of the set-associative mapping in the DA 24 are read. In this embodiment, the serial access of the DA 24 after the TA 22 allows a single way of DA 24 to be read, thus DA 24 can save significant power and reduce data bank conflict.

For a load instruction, when cache hit, the data is fetched from the DA 24 written back to the destination register of the register file 16 through write control of the write shifter 23. For cache miss, the status of the destination register in the scoreboard 14 is changed to unknown and the load data is fetched from memory 30. The cache miss load data from memory 30 are written back to the destination register of the register file 16 by the reserved write port. In implementation, the load data from the memory 30 are written to a data miss buffer (not shown), then the data miss buffer will write back to the destination register of the register file 14 and eventually write the cache line data to the data cache 24.

For a store instruction, when the cache hit, the store data are scheduled to read from the register file 16 just in-time by the read shifters 21 to write to DA 24. For cache miss, the store data are sent to the store miss buffer (not shown) in the load/store unit 17. In the conventional execution of the store instruction, the source register for the tag address and the source register for the store data can be read at the same time from the register file 14 in which case the store buffer is needed to keep the store data until time that it is written to DA 24. In this invention, the time to write store data to DA 24 (assuming cache hit) is known, therefore, the read port control is scheduled to read the source register for store data "just-in-time" from the register file 14 to write to DA 24, thus the store buffer is not needed. For cache miss, the source register for store data is not read from the register file 14 until the store data are ready to write to the data cache which is "just-in-time" reading of the source register.

For cache miss, the load/store unit 17 may allow many pending cache miss requests to memory 30. The multiple pending miss requests are kept in a miss request queue (not shown) in the load/store unit 17. The new cache line is fetched from memory 30 into a miss data buffer (not shown) in the data cache 18. The miss data buffer may consist of multiple cache lines. In addition, the replacement cache line in the data cache 18 may be dirty where the dirty cache line must be written back to the memory 30 before new cache line from memory 30 can be written into the data cache 18. The dirty cache line is fetched from the data cache 18 into an eviction buffer before evicting to memory 30. The eviction buffer may be implemented as part of the miss data buffer. The eviction buffer, the miss request queue, and the miss data buffer must be checked by subsequent load/store instructions for matching and forwarding of data.

The load/store instructions may have precise exception in which all subsequent instructions must be discarded from the execution pipeline. Similar to branch instruction, all subsequent instructions after the load/store instruction cannot write back to the register file 16 until after the execution of the load/store instruction. The load/store instruction with cache miss may have the data error exception which is imprecise exception and is taken by stopping the decode/issue unit 13 from issuing any more instruction and after completion of all instructions in the execution pipeline. Interrupt is similar to the imprecise exception where interrupt is taken by stopping the decode/issue unit 13 from issuing any more instructions and after completion of all instructions in the execution pipeline.

Figure 7A:
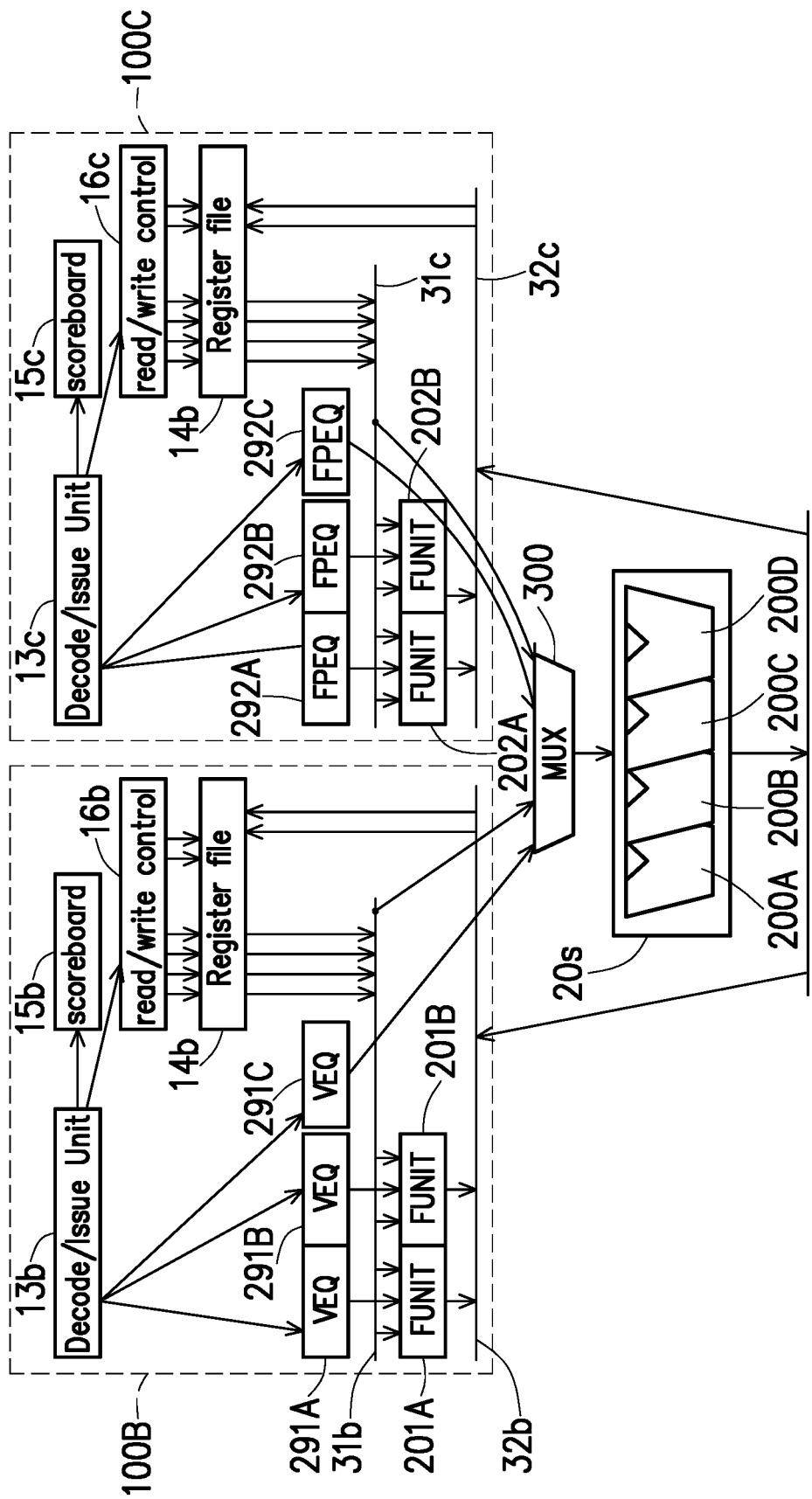
FIGS. 7A-7B are diagrams illustrating various structures of a microprocessor in accordance with some embodiments.

FIG. 7A is a diagram illustrating execution blocks 100B and 100C in accordance with some embodiments. For simplicity, the execution block 100B is also referred to as a vector execution block 100B that is dedicated for processing vector instructions; and the execution block 100C is also referred to as a FP execution block 100B that is dedicated for processing FP instructions. However, each of the execution blocks 100B and 100C may be configured to process any other type of instructions. Each of the execution blocks 100B and 100C may include the same elements as the execution block 100A. For example, each of the execution blocks 100B and 100C may include a decode/issue unit, a scoreboard, a read/write control unit, a register file, execution queues and functional units. The execution blocks 100B and 100C are also referred to as a first-type issue unit and a second-type issue unit.

In some embodiments, the instructions of different types may be decoded in parallel by the decode/issue units 13b and 13c in the execution blocks 100B and 100C. In parallel decoding of instructions, each of the decode/issue units 13b and 13c may validate the instruction in one of the execution blocks 100B and 100C, and the instruction can only be valid in one of the execution blocks 100B and 100C at a time.

In some embodiments, each of the decode/issue units 13b and 13c in the execution blocks 100B and 100C checks and resolves all possible conflicts of instructions of different types before issuing the instructions. The same mechanism may be used for resolving data dependency and controlling the read/write ports in the execution blocks 100B and 100C as in the execution block 100A. Elements referred to herein with a particular reference number followed by a letter will be collectively referred to by the reference number alone.

For example, execution queues 291A-291C will be collectively referred to as execution queues 291 for execution block 100B and execution queues 292A-292C will be collectively referred to as execution queues 292 for execution block 100C unless specified. As such, the detailed description about the decode/issue units 13b and 13c is omitted hereafter.

The register file 14b and 14c, the scoreboards 15b and 15c, the read/write control units 16b and 16c, the execution queues 291 and 292, and functional units 201 and 202 in the execution blocks 100B and 100C may be similar to the register file 14, the scoreboard 15, the read/write control unit 16, execution queues 19, and functional units 20 in the execution block 100A. The register file 14, the scoreboard 15, the read/write control unit 16, the execution queues 19, and the functional units 20 in execution block 100A are for scalar integer instructions while the register file 14b, the scoreboard 15b, the read/write control unit 16b, the execution queues 291 and the functional units 201 in the execution block 100B are dedicated for vector instructions, and the register file 14c, the scoreboard 15c, the read/write control unit 16c, the execution queues 292, and the functional units 202 in the execution block 100C are dedicated for FP instructions. The structure and functionalities of these elements in the execution blocks 100B and 100C may be deduced from the corresponding elements in the execution block 100A, thus the detailed description about the execution blocks 100B and 100C is omitted hereafter.

In some embodiments, the microprocessor 100 may further include a multiplex 300 and a shared functional unit 20s, in which the shared functional unit 20s is shared for the execution blocks 100B and 100C. The shared functional unit 20s may execute the vector instruction dispatched from the execution block 100B and the FP instruction dispatched from the execution block 100C. The shared functional unit 20s may receive the vector instruction and the FP instruction from the multiplex 300 and execute the received instruction. In some embodiments, the vector execution queue 291C and FP execution queue 292C are constructed, such that only one of the execution queues 291C or 292C can send valid instruction at a time to the shared functional unit 20s through the multiplex 300. In other words, the multiplex 300 may provide only one of the vector instruction or the FP instruction to the shared functional unit 20s at a time, and the shared functional unit 20s executes only one of the vector instruction or the FP instruction at a time. In some embodiments, the shared functional unit 20s is coupled to the register files 14b and 14c of the execution blocks 100B and 100C via the multiplex 300 and the read buses 31b and 31c, and the result data from the shared functional unit 20s is written back to the register files 14b or 14c via the result buses 32b and 32c.

In some embodiments, the shared functional unit 20s may include a plurality of execution units 200A through 200D that are configured to execute multiple elements of the vector instructions. The vector instructions are different from the scalar integer and FP instructions in two aspects: (1) the vector instruction operates on many elements while the scalar integer or FP instruction operate on a single element, (2) the many elements of vector instructions can be grouped into smaller sets of elements to be executed in sequences as micro-operations. For example, the vector instruction can be programmed to execute on 32 elements which can be executed in hardware as 8 micro-ops of 4 elements; where each element is 32-bit of data. The execution of 4 elements is performed by the execution units 200A-200D in FIG. 7A. In some embodiments, some functional units of the shared functional unit 20s are shared for both VEQ 291C and the FPEQ 292C; and some functional units of the shared functional unit 20s are dedicated for executing multiple elements of the vector instructions. In an example, the functional unit 200D is shared for executing elements of both vector instructions and FP instruction; and the functional units 200A through 200C are dedicated for executing some elements of the vector instructions. The number of shared execution units in the shared functional unit 20s is not limited in the disclosure.

In an embodiment, the multiplex 300 is coupled to the VEQ 291C of the execution block 100B and the FPEQ 292C of the execution block 100C, and is configured to select and dispatch the vector instruction from the VEQ 291C or the FP instruction from the FPEQ 292C to the shared functional unit 20s for execution. In an alternative embodiment, the execution blocks 100B and 100C include multiple VEQs 291 and multiple FPEQs 292, and the multiplex 300 are coupled to the multiple VEQs 291 and multiple FPEQs 292 to select and provide valid instruction from the VEQs 291 and FPEQs 292 to the shared functional unit 20s for execution. In some embodiments, the VEQ 291C and FPEQ 292C may provide a valid indication indicating a valid instruction (i.e., vector instruction or the FP instruction) to the multiplex 300. The multiplex 300 may select the vector instruction or the FP instruction based on the valid indication from the VEQ 291C and FPEQ 292C. In some embodiment, only one of the vector instruction and the FP instruction is valid at a time, thus only one of the vector instruction or the FP instruction is sent to the shared functional unit for execution.

In some embodiments, the multiplex 300 is coupled to the register files 14b and 14c of the execution blocks 100B and 100C via read buses 31b and 31c to receive the operand data associated with the vector instruction and the FP instruction. The operand data associated with the vector instruction or the FP instruction may be sent to the shared functional unit 20s via the multiplex 300 as shown by the connection from the register file read buses 31b and 31c to the multiplex 300.

In some embodiments, the operand data from register files 14b and 14c are sent to the shared functional unit 20s through the multiplex 300, in synchronization with the VEQ 291C and FPEQ 292C. For example, the VEQ 291C and FPEQ 292C may dispatch the instruction to the shared functional unit 20 via the multiplex 300 at the same time as the operand data are read from the register files 14b and 14c. In some embodiments, the read/write control unit 16b and 16c schedule the read time and write time of the instruction, such that the operand data from register files 14b and 14c are sent to the shared functional unit 20s in synchronization with operations of the VEQ 291C and FPEQ 292C. Because only one of the VEQ 291C and FPEQ 292C is allowed to send valid instruction to shared functional unit 20s at a time, the selection of the multiplex 300 is mutually exclusive by either the VEQ 291C or FPEQ 292C.

In some embodiments, the execution block 100B includes functional units for integer, permutation, mask, and floating-point and the execution block 100C includes functional units for only floating-point. In some embodiments, the floating-point functional units include a FP multiply-accumulate (FP MACC) functional unit, a FP divide (FP DIV) functional unit, a FP miscellaneous (FP MISC) functional unit, in which the FP MACC is configured to execute FP multiply instruction, FP add/sub instruction, and FP multiply-accumulate instruction; the FP DIV functional unit is configured to execute the FP divide instruction; and the FP MISC functional unit is configured to execute other instructions such as integer-FP conversion, FP compare, FP min, FP max instructions. In some embodiments, the FP MACC functional unit is more critical than the other FP functional units, thus dedicated FP MACC functional unit is designed for each of the execution blocks 100B and 100C, and the other FP functional units are shared for both the execution blocks 100B and 100C. In an example, a FP MACC functional unit is dedicated for executing the FP instructions of the execution block 100C, and a vector FP MACC functional unit is dedicated for executing the vector FP instructions of the execution block 100B. In some alternative embodiments, the execution block 100B has multiple vector FP MACC functional units, in which one vector FP MACC functional unit is shared with the execution block 100C while another vector FP MACC functional unit is dedicated for the execution block 100B.

Figure 7B:
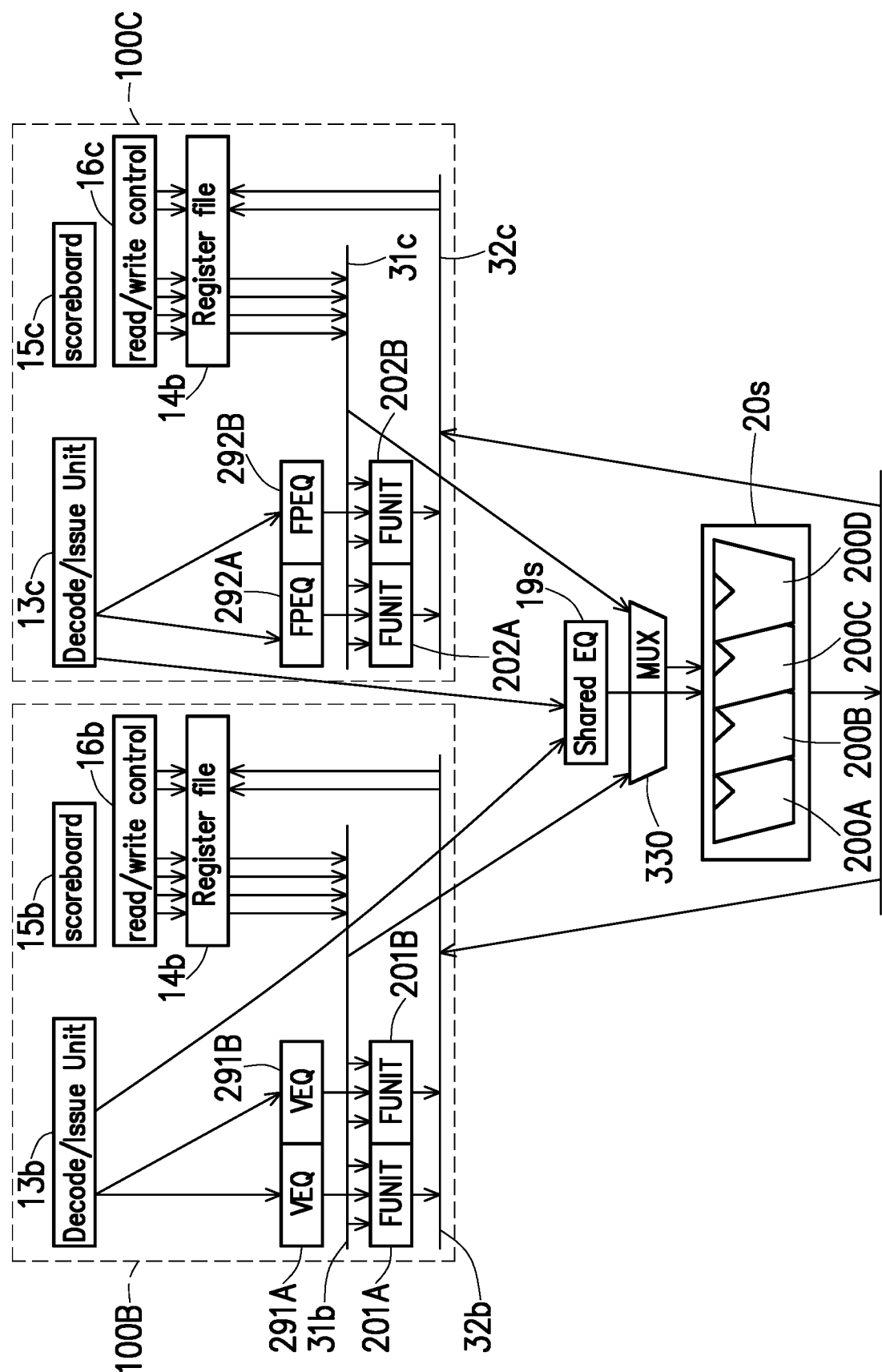

FIG. 7B illustrates a diagram of the execution blocks 100B and 100C in accordance with some embodiments. A difference between the diagram illustrated in FIG. 7A and the diagram illustrated in FIG. 7B is that FIG. 7B illustrates a shared execution queue 19s and multiplex 330 instead of the multiplex 300. The shared execution queue 19s is coupled to the decode/issue unit 13b and 13c of the execution blocks 100B and 100C, and is configured to receive vector instruction dispatched by the decode/issue unit 13b or the FP instruction dispatched by the decode/issue unit 13c. In some embodiments, the decode/issue units 13b and 13c are constructed so that only one of the decode/issue units 13b and 13c can send valid instruction to the shared execution queue 19s. In other words, only one of either the vector instruction or the FP instruction is written to an entry among plurality of entries in the shared execution queue 19s at a time. In another embodiment, the decode/issue units 13b and 13c have a stalled mechanism that may stall one of the decode/issue units 13b and 13c based on the sequence of the instructions if the instructions from the execution blocks 100B and 100C are to the shared functional unit 20s. In another embodiment, the vector and FP instructions use the instruction order priority to allow decode/issue unit 13b or 13c to dispatch only 1 instruction to the shared execution queue 19s at a time. Yet in another embodiment, the decode/issue units 13b and 13c can dispatch both vector and FP instructions to the shared execution queue 19s at the same time and write to 2 entries by the instruction order in the shared execution queue 19s. The register operand data from register files 14b and 14c are synchronized with the shared execution queue 19s by the read/write control units 16b and 16c, respectively, to send data to multiplex 330 for execution by the shared functional unit 20s. In other words, the multiplex 330 selects the register operand data from the register file 14b in synchronization with the vector instruction to be issued by the shared execution queue 19s, or the multiplex 330 selects the register operand data from the register file 14c in synchronization with the FP instruction to be issued by the shared execution queue 19s. For example, the shared execution queue 19s may dispatch the instruction to the shared functional unit 20s at the same time as the operand data are read from the register file 14b or 14c. The read/write control unit 16b and 16c may schedule the read time and write time of the instruction, such that the operand data from register files 14b and 14c are sent to the shared functional unit 20s in synchronization with operations of the shared execution queue 19s.

The shared execution queue 19s may include a plurality of fields as the EQ 19 shown in FIG. 6. Some embodiments of the disclosure may use more, less, or different fields of the shared execution queue 19s than those illustrated in FIG. 6. In an embodiment, the shared execution queue 19s has a tag bit field (not shown) that records a tag bit per entry of the shared execution queue 19s to indicate the instruction type (e.g., vector or FP) of the instruction recorded in each entry of the shared execution queue 19s. The tag bits recorded in the shared execution queue 19s may be used to select operand data from register files 14b and 14c of the execution blocks 100B or 100C. For example, when the tag bit in an entry of the shared execution queue 19s indicated that the recorded instruction is the vector instruction, the operand data associated with the vector instruction are selected from the register file 14b of the execution block 100B. The vector instruction and the FP instruction stored in the shared execution queue 19s may be dispatched to the shared functional unit 20s in a dispatching order. The dispatching order of the shared functional unit 20s may be determined according to the read count value recorded in the read count field 197 of the functional unit 20s (i.e., read count field 197 of the execution queue 10 shown in FIG. 6).

Figure 8:
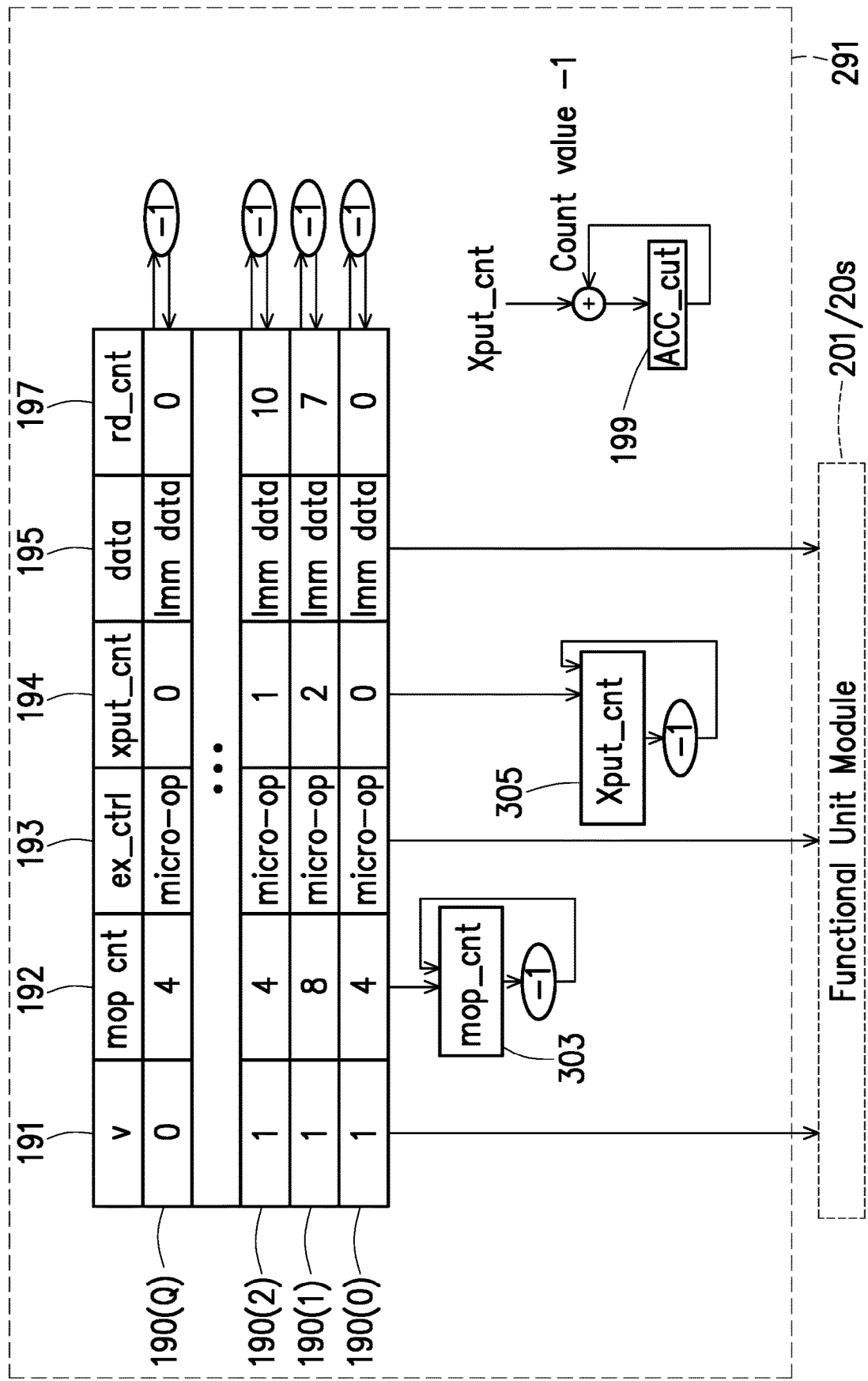
FIG. 8 is a diagram illustrating an execution queue in accordance with some embodiments.

FIG. 8 illustrates a diagram of the VEQ 291 in accordance with some embodiments. The VEQ 291 may include a plurality of entries 190(0) through 190(Q), in which each entry of the VEQ 291 is configured to record information about one vector instruction. In some embodiments, each entry of the VEQ 291 includes a plurality of fields which could be same as or different from the fields of the EQ 19 shown in FIG. 6. For example, the valid field 191, the execution control data field 193, the data field 195 and the read count field 197 in VEQ 291 shown in FIG. 8 are same as the corresponding fields in the EQ 19 shown in FIG. 6. In addition, the accumulate throughput counter 199 shown in FIG. 8 is same as the accumulate throughput counter 199 shown in FIG. 6. The detailed description regarding the same elements of the VEQ 291 in FIG. 8 and the execution queue 19 in FIG. 6 is omitted.

The VEQ 291 may further include a micro-op count field 192 and a throughput count field 194, in which the micro-op count field 192 represents a number of micro operations in the vector instruction. For example, the vector instructions in the entries 190(0) and 190(2) have 4 micro operations; and the vector instruction in the entry 190(1) has 8 micro operations. The throughput count field 194 is configured to represent a throughput time (e.g., a number of clock cycles) of each micro operation in the vector instruction.

In some embodiments, the VEQ 291 includes or is coupled to a micro-op counter 303 for tracking the number of micro operations that are executed. The micro-op counter 303 may receive the value of the micro-op count field 192 of the first entry 190(0) and decrement the value by one for every micro-op dispatching to functional unit 201 or 20s. In some embodiments, the micro-op counter 303 decrements value of the micro-op count field 192 to 0 before the corresponding entry can be invalidated by resetting the valid field 191. In the example, the vector instruction in the first entry 190(0) has 4 micro-ops with throughput time of 1 clock cycle. As such, the value of micro-op count field 192 is decremented by one every clock cycle. The throughput count field 194 of a micro-op having throughput latency of 1 clock cycle is set to "0". The throughput time in the throughput count field 194 is always 1 less than the actual throughput time.

In some embodiments, the VEQ 291 further includes a throughput counter 305 for tracking throughput time of the micro operations that are dispatched to the functional unit 201 or 20s. The throughput counter 305 may receive the value of the throughput count field 194 corresponding to the first micro operation from the first entry 190(0) and decrement the value by one every clock cycle until the value of throughput count field 194 corresponding to the first micro operation reach 0. When the value of throughput count field 194 corresponding to the first micro operation reaches 0, the throughput counter 305 is reloaded with the value of the throughput count field 194 corresponding to the next micro-operation, and the count down process is repeated if the mop count field 192 is greater than 1. In some embodiments, the valid field 191 of an entry of the VEQ 291 remains valid until the values of both micro-op counter 303 and the throughput counter 305 reach 0.

In some embodiments, the FPEQs 292 of execution block 100C may have substantially same structure as the execution queue 19 of the execution block 100A illustrated in FIG. 6. Thus, the detailed description about the FPEQs 292 of execution block 100C is omitted hereafter.

Figure 9:
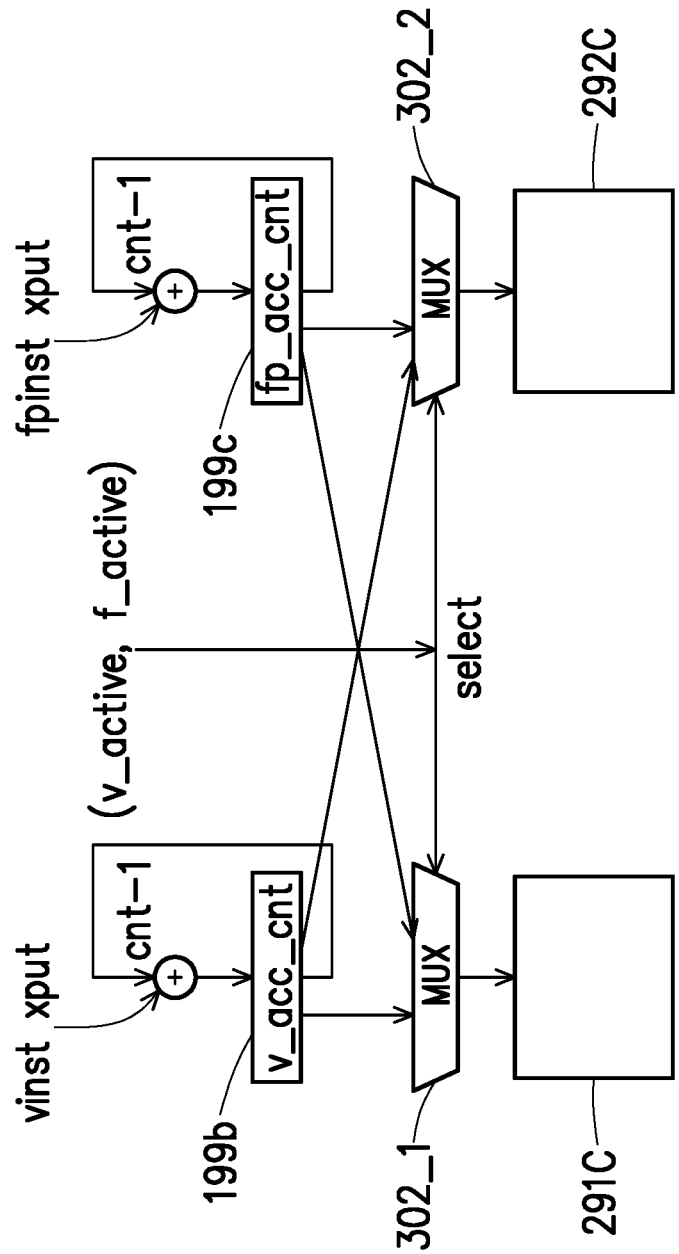
FIG. 9 is a flowchart illustrating a process to issue an instruction in accordance with some embodiments.

Referring to FIG. 9, a process for issuing instructions of different types in a microprocessor are illustrated in accordance with some embodiments. The microprocessor illustrated in FIG. 9 may include a vector accumulate throughput counter 199b and a FP accumulate throughput counter 199c, in which the vector accumulate throughput counter 199b is used for tracking accumulate throughput count of valid entries in VEQs 291, 291C, and the FP accumulate throughput counter 199c for tracking the accumulate throughput count of valid entries in the FPEQs 292, 292C.

The microprocessor illustrated in FIG. 9 further includes multiplexes 302_1 and 302_2 that are coupled to the vector accumulate throughput counter 199b and the FP accumulate throughput counter 199c. The multiplex 302_1 is configured to select either the vector accumulate throughput counter 199b or the FP accumulate throughput counter 199c as the read time (or read count rd_cnt) in the field 197 of FIG. 8 to issue a vector instruction to the VEQ 291C. The multiplex 302_1 is configured to select either the vector accumulate throughput counter 199b or the FP accumulate throughput counter 199c as the read count rd_cnt in the field 197 of FIG. 8 to issue a scalar FP instruction to the FPEQ 292C. In some embodiments, the multiplexes 302_1 and 302_2 performs the selections based on a vector active bit v_active and a FP active bit f-active (not shown). For example, the multiplexes 302_1 and 302_2 select the vector accumulate throughput counter 199b for issuing the instruction when the vector active bit v-active is set and the FP active bit f-active is cleared; and the multiplexes 302_1 and 302_2 select the FP accumulate throughput counter 199c for issuing the instruction when the vector active bit v-active is cleared and the FP active bit f-active is set. In some embodiments, the last instruction type to be issued sets the active bit. For example, when the last instruction to be issued is the vector instruction, the active bit v-active is set; and when the last instruction to be issued is the FP instruction, the active bit f-active is set. In another embodiment, if both vector and FP instructions are valid at the same time and the vector instruction has higher priority than FP instruction, then the read time of vector instruction follows the procedure as described above and the read time of the FP instruction is the read time of the vector instruction added to the throughput time of the vector instruction. Both vector and FP instruction can be issued at the same time to execution queues 291C and 292C, respectively. In some embodiments, the vector accumulate throughput counter 199b, the multiplex 302_1 and the VEQ 291 are included in the execution block 100B shown in FIG. 1; and the FP accumulate throughput counter 199c, the multiplex 302_2 and the FPEQ 290C are included in the execution block 100C shown in FIG. 1.

In an embodiment, the shared execution queue 19s in FIG. 7B includes a single accumulate throughput counter (not shown) that tracks accumulate throughput count of valid entries of the shared execution queue 19s. Referring to FIG. 7B and FIG. 9, the single accumulate throughput counter may be represented as the combination of the accumulate throughput counters 199b and 199c shown in FIG. 9. In this embodiment, the single accumulate throughput counter is updated according to instruction order of the instructions recorded in the shared execution queue 19s. For example, the single accumulate throughput counter may be updated according to the last instruction indicated by the instruction order of the shared execution queue 19s. As mentioned above, if both vector and FP instructions are issued at the same time to the shared queue 19s in FIG. 7B, the vector and FP instructions are recorded in two entries according to the instruction order of the shared execution queue 19s. Instruction priorities of the vector and FP instructions may determine the instruction order of the vector and FP instructions being issued at the same time to the shared execution queue 19s. The value of the single accumulate throughput counter is used as the read time (or read count rd_cnt in field 197 of FIG. 6) of the recorded instruction in the shared execution queue 19s.

Figure 10:
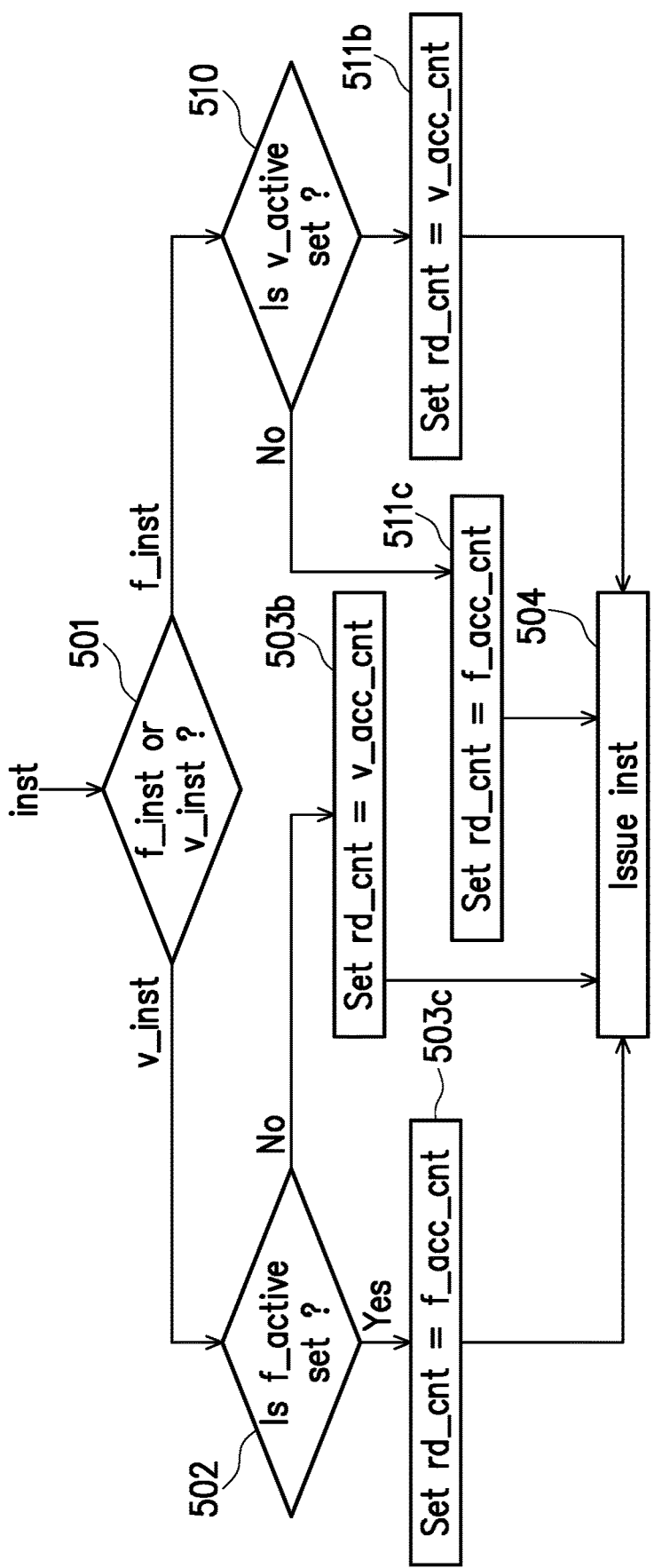
FIG. 10 is a flowchart illustrating a method adapted to a microprocessor in accordance with some embodiments.

FIG. 10 illustrates a flowchart diagram for issuing an instruction to a shared functional unit based on active bits v-active and f-active in accordance with some embodiments. An assumption is that one valid instruction is sent to the decode/issue units in execution blocks 100B and 100C in FIG. 1. The execution blocks 100B and 100C are designed such that only one of the execution blocks 100B and 100C decodes the valid instruction as referred to in block 501. If the valid instruction inst is determined as a vector instruction v_inst in block 501, the execution block 100B is used to issue the valid instruction. Block 502 determines whether the FP active bit f active is set or cleared. If the FP active bit f active is cleared, the vector accumulate throughput counter 199b of the execution block 100B is used to issue the vector instruction to the vector execution queue (i.e., VEQ 291 in FIG. 8), and the read count value corresponding to the issued instruction (i.e., the read count rd_cnt in the field 197 in FIG. 8) is set to the value of the vector accumulate throughout counter 199b in block 503b. Otherwise, if the FP active bit f active is set, the FP accumulate throughput counter 199c of the execution block 100C is used to issue the vector instruction v_inst to the vector execution queue (i.e., VEQ 291 in FIG. 8), and the read count value corresponding to the issued instruction (i.e., the read count rd_cnt in the field 197 in FIG. 8) is set to the value of the FP accumulate throughput counter 199c in block 503c. It is further noted that as long as the read time of the vector instruction v_inst is equal or greater than the accumulated time (i.e., the value of the vector accumulate throughput counter 199b or the FP accumulate throughput counter 199c) selected by block 502, then the vector instruction v_inst can be issued to the vector execution queue (i.e., VEQ 291 in FIG. 8), and the selected accumulate time is set to the vector instruction read time (i.e., value of the read count rd_cnt in field 197 in FIG. 8) and the throughput time of the issued vector instruction. The read time of vector instruction may be greater than the selected accumulative time due to read/write port conflict or data dependency of the vector source and/or destination registers.

Returning to block 501, if the valid instruction inst is determined as the FP instruction f_inst, the execution block 100C is used to issue the valid instruction. Block 510 determines whether the vector active bit v_active is set or cleared. If the vector active bit v_active is cleared, the FP accumulate throughput counter 199c of the execution block 100C is used to issue the FP instruction f_inst to the FP execution queue (i.e., FPEQ 291 in FIG. 8 and EQ 19 in FIG. 6), and the read count value corresponding to the issued instruction (i.e., read count rd_cnt in field 197 in FIG. 6) to the value of the FP accumulate throughput counter 199c in block 511c. Otherwise, if the vector active bit v_active is set, the vector accumulate throughput counter 199b of the execution block 100B is used to issue the FP instruction f_inst to the FP execution queue (i.e., FPEQ 291 in FIG. 8 or EQ 19 in FIG. 6), and the read count value corresponding to the issued instruction (i.e., read count rd_cnt in field 197 in FIG. 6) is set to the value of the vector accumulate throughput counter 199b in block 511b. It is further noted that as long as the read time of the FP instruction f_inst is equal or greater than the accumulated time (i.e., the value of the vector accumulate throughput counter 199b or the FP accumulate throughput counter 199c) selected by block 510, then the FP instruction f_inst can be issued to the FP execution queue (i.e., FPEQ 291 in FIG. 8), and the selected FP accumulate time is set to the FP instruction read time (i.e., value of the read count rd_cnt in field 197 in FIG. 6) and the throughput time of the issued FP instruction. The read time of FP instruction may be greater than the selected accumulative time due to read/write port conflict or data dependency of the FP source and/or destination registers.

In accordance with one of the embodiments, a microprocessor that includes a shared functional unit, a first execution queue, a second execution queue, a first-type issue unit and a second-type issue unit is disclosed. The first execution queue includes a plurality of entries, wherein each entry of the first execution queue records a first-type instruction, each entry of the first execution queue include a first count value corresponding to the first-type instruction, the first count value is decremented until the first count value reaches 0. The first execution queue dispatches the first-type instruction to the shared functional unit when the first count value corresponding to the first-type instruction reaches 0. The second execution queue includes a plurality of entries, wherein each entry of the second execution queue records a second-type instruction each entry of the second execution queue includes a second count value corresponding to the second-type instruction, the second count value is decremented until the second count value reaches 0. The second execution queue dispatches the second-type instruction to the shared functional unit when the second count value corresponding to the second-type instruction reaches 0. The shared functional unit executes a first-type instruction and a second-type instruction. The reading and writing of data of the register files are preset to be synchronized for the exact execution time in the future of the shared functional unit for either the first-type instruction or the second-type instruction. No dynamic conflict resolution, no dynamic data dependency resolution, and no dynamic read/write ports resolution are needed as with prior-art. The dynamic resolutions are the most power consumption in microprocessor design. The microprocessor is configured to mutually dispatch the first-type instruction from the first execution queue and the second-type instruction from the second execution queue to the shared functional unit. The first-type issue unit issues the first-type instruction to the first execution queue, schedules read time and write time of the first-type instruction, and sets the first count value recorded in each entry of the first execution queue. The second-type issue unit issues the second-type instruction to the second execution queue, schedules read time and write time of the second-type instruction, and sets the second count value recorded in each entry of the second execution queue.

In accordance with one of the embodiments, a method that is adapted to a first execution queue, a second execution queue, a shared functional unit, a first-type issue unit and a second type-issue unit is introduced. The method comprises steps of issuing, by the first type issue unit, a first-type instruction to the first execution queue; scheduling, by the first type issue unit, read time and write time of the first-type instruction; setting, by the first type issue unit, a first count value recorded in each entry of the first execution queue, wherein the first count value is decremented until the first count value reaches 0; dispatching, by the first execution queue, the first-type instruction recorded in an entry of the first execution queue to the shared functional unit in response to determining that the first count value included in the entry of the first execution queue reaches 0; issuing, by the second type issue unit, a second-type instruction to the second execution queue; scheduling, by the second type issue unit, read time and write time of the second-type instruction; setting, by the second type issue unit, the second count value recorded in each entry of the second execution queue, wherein the second count value is decremented until the second count value reaches 0; dispatching, by the second execution queue, the second-type instruction recorded in an entry of the second execution queue to the shared functional unit in response to determining that a second count value included in the entry of the second execution queue reaches 0; and executing, by the shared functional unit, the first-type instruction and the second-type instruction. The first-type instruction from the first execution queue and the second-type instruction from the second execution queue are mutually dispatched to the shared functional unit.

In accordance with one of the embodiments, a data processing system that includes a memory and a microprocessor is provided. The memory is configured to store a first-type instruction and a second-type instruction. The microprocessor includes a shared functional unit, a first execution queue, a second execution queue, a first-type issue unit and a second-type issue unit. The first execution queue includes a plurality of entries, wherein each entry of the first execution queue records a first-type instruction, each entry of the first execution queue include a first count value corresponding to the first-type instruction, the first count value is decremented until the first count value reaches 0. The first execution queue dispatches the first-type instruction to the shared functional unit when the first count value corresponding to the first-type instruction reaches 0. The second execution queue includes a plurality of entries, wherein each entry of the second execution queue records a second-type instruction, each entry of the second execution queue includes a second count value corresponding to the second-type instruction, the second count value is decremented until the second count value reaches 0. The second execution queue dispatches the second-type instruction to the shared functional unit when the second count value corresponding to the second-type instruction reaches 0. The shared functional unit executes a first-type instruction and a second-type instruction, wherein the first-type instruction from the first execution queue and the second-type instruction from the second execution queue are mutually dispatched to the shared functional unit. The first-type issue unit issues the first-type instruction to the first execution queue, schedules read time and write time of the first-type instruction, and sets the first count value recorded in each entry of the first execution queue. The second-type issue unit issues the second-type instruction to the second execution queue, schedules read time and write time of the second-type instruction, and sets the second count value recorded in each entry of the second execution queue.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A microprocessor, comprising:
   a first execution queue, comprising a plurality of first entries, wherein each first entry of the first execution queue records a first-type instruction, each first entry of the first execution queue comprises a first count value corresponding to the first-type instruction of each first entry, the first count value of each first entry is decremented until the first count value of each first entry reaches 0, and the first execution queue dispatches the first-type instruction of a first entry among the plurality of first entries to a shared functional unit when the first count value corresponding to the first-type instruction of the first entry reaches 0,
   a second execution queue, comprising a plurality of second entries, wherein each second entry of the second execution queue records a second-type instruction, each second entry of the second execution queue comprises a second count value corresponding to the second-type instruction of each second entry, the second count value of each second entry is decremented until the second count value reaches 0, and the second execution queue dispatches the second-type instruction of a second entry among the plurality of second entries to the shared functional unit when the second count value corresponding to the second-type instruction of the second entry reaches 0,
   the shared functional unit, executing the first-type instruction of the first entry and the second-type instruction of the second entry, wherein the first-type instruction of the first entry from the first execution queue and the second-type instruction of the second entry from the second execution queue are mutually exclusive dispatched to the shared functional unit,
   a first-type issue unit, issuing the first-type instruction of each first entry to the first execution queue, scheduling read time and write time of the first-type instruction of each first entry, and setting the first count value recorded in each first entry of the first execution queue; and
   a second-type issue unit, issuing the second-type instruction of each second entry to the second execution queue, scheduling read time and write time of the second-type instruction of each second entry, and setting the second count value recorded in each second entry of the second execution queue.

2. The microprocessor of claim 1, wherein
   the first count value in each first entry of the first execution queue represents the read time of the first-type instruction of each first entry, the first count value in each first entry of the first execution queue decrements by one every clock cycle until the first count value reaches 0, and the first-type instruction recorded in each first entry of the first execution queue is dispatched to the shared functional unit when the first count value corresponding to the first-type instruction of each first entry reaches 0.

3. The microprocessor of claim 1, wherein the first-type issue unit comprises a first-type decode/issue unit, a first-type register file, a first-type scoreboard, a first-type read/write control unit for the first-type register file, and the first execution queue, and the second-type issue unit comprises a second-type decode/issue unit, a second-type register file, a second-type scoreboard, a second-type read/write control unit for the second-type register file, and the second execution queue.

4. The microprocessor of claim 3, wherein the first-type issue unit schedules the read time of the first-type instruction of each first entry to read operand data of the first-type instruction of each first entry from the first-type register file and schedules the write time of the first-type instruction of each first entry to write result data from the shared functional unit to the first-type register file, in synchronization with an execution of the first-type instruction of each first entry in the shared functional unit, the second-type issue unit schedules the read time of the second-type instruction of each second entry to read operand data of the second-type instruction of each second entry from the second-type register file and schedules the write time of the second-type instruction of each second entry to write result data from the shared functional unit to the second-type register file, in synchronization with an execution of the second-type instruction of each second entry in the shared functional unit, the first-type issue unit resolves data dependencies and resource conflicts of the first-type instruction of each first entry to set the first count value recorded in each first entry of the first execution queue, and the second-type issue unit resolves data dependencies and resource conflicts of the second-type instruction of each second entry to set the second count value recorded in each second entry of the second execution queue.

5. The microprocessor of claim 3, further comprising:

a first multiplexer, coupled to the first execution queue, the second execution queue and the shared functional unit, configured to mutually exclusive dispatch the first-type instruction of each first entry from the first execution queue or the second-type instruction of each second entry from the second execution queue to the shared functional unit, wherein the first multiplexer is further coupled to the first-type register file and the second-type register file through a first read bus and a second read bus, respectively, and the first multiplexer mutually exclusive dispatches operand data from the first-type register file or operand data from the second-type register file to the shared functional unit.

6. The microprocessor of claim 5, wherein the first execution queue further comprises a first accumulate throughput counter which decrements by one every clock cycle, the first accumulate throughput counter represents in which clock cycle the first-type issue unit is allowed to issue a next first-type instruction to the first execution queue, and the second execution queue further comprises a second accumulate throughput counter which decrements by one every clock cycle, the second accumulate throughput counter represents in which clock cycle the second-type issue unit is allowed to issue a next second-type instruction to the second execution queue.

7. The microprocessor of claim 6, wherein the first-type issue unit, issuing the first-type instruction of each first entry to the first execution queue using the first accumulate throughput counter or the second accumulate throughput counter, as a read time of the issued first-type instruction of each first entry, based on a first active bit of the first execution queue and a second active bit of the second execution queue; and the second-type issue unit, issuing the second-type instruction of each second entry to the second execution queue using the first accumulate throughput counter or the second accumulate throughput counter, as a read time of the issued second-type instruction of each second entry, based on the first active bit of the first execution queue and the second active bit of the second execution queue, wherein the first active bit is set in response to the first decode/issue unit issuing the first-type instruction of each first entry, the second active bit is set in response to the second decode/issue unit issuing the second-type instruction of each second entry.

8. The microprocessor of claim 3, further comprising:

a shared execution queue, shared for the first-type issue unit and the second-type issue unit, receiving the first-type instruction of each first entry and the second type-instruction of each second entry, and recording the first-type instruction of each first entry and the second type-instruction of each second entry to entries of the shared execution queue, and dispatching the first-type instruction and the second type-instruction recorded in the plurality of first and second entries of the shared execution queue in order; and a second multiplexer, coupled to the first-type register file and the second-type register file through a first read bus and a second read bus respectively, receiving operand data of the first-type instruction of each first entry through first read bus or operand data of the second-type instruction of each second entry through second read bus, and mutually exclusive dispatching the operand data of the first-type instruction of each first entry and the operand data of the second-type instruction of each second entry to the shared functional unit, wherein the second multiplexer dispatches the operand data of the first-type instruction of each first entry and the operand data of the second-type instruction of each second entry in synchronization with a dispatch of the first-type instruction of each first entry and the second-type instruction of each second entry by the shared execution queue.

9. The microprocessor of claim 8, wherein the shared execution queue includes an accumulate throughput counter that tracks accumulate throughput count of valid entries of the shared execution queue, the accumulate throughput counter is updated according to a last instruction to be issued to the shared execution queue from the first-type issue unit or the second-type issue unit, and the accumulate throughput counter is decremented by one every clock cycle, the accumulate throughput counter represents in which clock cycle the first-type issue unit or the second-type issue unit are allowed to issue a next instruction to the shared execution queue.

10. The microprocessor of claim 1, further comprising:
an unshared functional unit which has same functionality as the shared functional unit, wherein the unshared functional unit is dedicated to execute the first-type instruction of each first entry or the second-type instruction of each second entry.

11. The microprocessor of claim 1, wherein the shared functional unit comprises:
a first execution unit, shared for executing the first-type instruction of each first entry and the second-type instruction of each second entry; and
a second execution unit, dedicated for executing the first-type instruction of each first entry or the second-type instruction of each second entry.

12. A method, adapted to a microprocessor comprising a first execution queue, a second execution queue, a shared functional unit, a first-type issue unit and a second-type issue unit, the method comprising:
issuing, by the first-type issue unit, a first-type instruction to the first execution queue;
scheduling, by the first-type issue unit, read time and write time of the first-type instruction;
setting, by the first-type issue unit, a first count value recorded in each entry of the first execution queue, wherein the first count value is decremented until the first count value reaches 0;
dispatching, by the first execution queue, the first-type instruction recorded in an entry of the first execution queue to the shared functional unit in response to determining that the first count value included in the entry of the first execution queue reaches 0;
issuing, by the second-type issue unit, a second-type instruction to the second execution queue;
scheduling, by the second-type issue unit, read time and write time of the second-type instruction;
setting, by the second-type issue unit, a second count value recorded in each entry of the second execution queue, wherein the second count value is decremented until the second count value reaches 0;
dispatching, by the second execution queue, the second-type instruction recorded in an entry of the second execution queue to the shared functional unit in response to determining that a second count value included in the entry of the second execution queue reaches 0; and
executing, by the shared functional unit, the first-type instruction and the second-type instruction, wherein the first-type instruction from the first execution queue and the second-type instruction from the second execution queue are mutually exclusive dispatched to the shared functional unit.

13. The method of claim 12, wherein
the first count value in each entry of the first execution queue represents the read time of the first-type instruction,
the first count value in each entry of the first execution queue decrements by one every clock cycle until the first count value reaches 0, and
the first-type instruction recorded in the first execution queue is dispatched to the shared functional unit in response to the first count value corresponding to the first-type instruction reaching 0.

14. The method of claim 12, wherein
the first-type issue unit comprises a first-type decode/issue unit, a first-type register file, a first-type scoreboard, a first-type read/write control unit for the first-type register file, and the first execution queue, and
the second-type issue unit comprises a second-type decode/issue unit, a second-type register file, a second-type scoreboard, a second-type read/write control unit for the second-type register tile, and the second execution queue.

15. The method of claim 14, wherein
the first-type issue unit schedules the read time of the first-type instruction to read operand data of the first-type instruction from the first-type register file and schedules the write time of the first-type instruction to write result data from the shared functional unit to the first-type register file, in synchronization with an execution of the first-type instruction in the shared functional unit,
the second-type issue unit schedules the read time of the second-type instruction to read operand data of the second-type instruction from the second-type register file and schedules the write time of the second-type instruction to write result data from the shared functional unit to the second-type register file, in synchronization with an execution of the second-type instruction in the shared functional unit,
the first-type issue unit resolves data dependencies and resource conflicts of the first-type instruction to set the first count value recorded in each entry of the first execution queue, and
the second-type issue unit resolves data dependencies and resource conflicts of the second-type instruction to set the second count value recorded in each entry of the second execution queue.

16. The method of claim 14, wherein
the first execution queue further comprises a first accumulate throughput counter which decrements by one every clock cycle, the first accumulate throughput counter represents in which clock cycle the first-type issue unit is allowed to issue a next first-type instruction to the first execution queue, and
the second execution queue further comprises a second accumulate throughput counter which decrements by one every clock cycle, the second accumulate throughput counter represents in which clock cycle the second-type issue unit is allowed to issue a next second-type instruction to the second execution queue;
the first-type issue unit issues the first-type instruction to the first execution queue using the first accumulate throughput counter or the second accumulate throughput counter, as a read time of the issued first-type instruction, based on a first active bit of the said first execution queue and a second active bit of the second execution queue; and
the second-type issue unit issues the second-type instruction to the second execution queue using the first accumulate throughput counter or the second accumulate throughput counter, as a read time of the issued second-type instruction, based on the first active bit of the said first execution queue and the second active bit of the second execution queue, wherein
the first active bit is set in response to the first decode/issue unit issuing the first-type instruction,
the second active bit is set in response to the second decode/issue unit issuing the second-type instruction.

17. The method of claim 14, wherein the microprocessor further comprises:
a first multiplexer, coupled to the first execution queue, the second execution queue and the shared functional unit, configured to mutually exclusive dispatch the first-type instruction from the first execution queue or the second-type instruction from the second execution queue to the shared functional unit, wherein the first multiplexer is further coupled to the first-type register file and the second-type register file through a first read bus and a second read bus, respectively, and the first multiplexer mutually exclusive dispatches operand data from the first-type register file or operand data from the first-type register file to the shared functional unit.

18. The method of claim 14, wherein the microprocessor further comprises:

a shared execution queue, shared for the first-type issue unit and the second-type issue unit, receiving the first-type instruction and the second type-instruction from a second multiplexer, and recording the first-type instruction and the second type-instruction to entries of the shared execution queue, and dispatching the first-type instruction and the second type-instruction recorded in entries of the shared execution queue in order; and a second multiplexer, coupled to the first-type register file and the second-type register file through a first read bus and a second read bus respectively, receiving operand data of the first-type instruction through first read bus or operand data of the second-type instruction through second read bus, and mutually exclusive dispatching the operand data of the first-type instruction and the operand data of the second-type instruction to the shared functional unit, wherein the second multiplexer dispatches the operand data of the first-type instruction and the operand data of the second-type instruction in synchronization with a dispatch of the first-type instruction and the second-type instruction by the shared execution queue.

19. The method of claim 18, wherein the shared execution queue includes an accumulate throughput counter that tracks accumulate throughput count of valid entries of the shared execution queue, and the accumulate throughput counter is updated according to a last instruction to be issued to the shared execution queue from the first-type issue unit or the second-type issue unit, and the accumulate throughput counter is decremented by one every clock cycle, the accumulate throughput counter represents in which clock cycle the first-type issue unit or the second-type issue unit are allowed to issue a next instruction to the shared execution queue.

20. A data processing system, comprising:

a memory, configured to store at least one first-type instruction and at least one second-type instruction; and a microprocessor, comprising:

a first execution queue, comprising a plurality of first entries, wherein each first entry of the first execution queue records a first-type instruction, each first entry of the first execution queue comprises a first count value which corresponds to the first-type instruction of each first entry, the first count value of each entry is decremented until the first count value reaches 0, and the first execution queue dispatches the first-type instruction of a first entry among the plurality of first entries to a shared functional unit when the first count value corresponding to the first-type instruction of the first entry reaches 0, a second execution queue, comprising a plurality of second entries, wherein each second entry of the second execution queue records a second-type instruction, each second entry of the second execution queue comprises a second count value which corresponds to the second-type instruction of each second entry, the second count value of each second entry is decremented until the second count value reaches 0, and the second execution queue dispatches the second-type instruction of a second entry among the plurality of second entries to the shared functional unit when the second count value corresponding to the second-type instruction of the second entry reaches 0, the shared functional unit, executing the first-type instruction of the first entry and the second-type instruction of the second entry, wherein the first-type instruction of the first entry from the first execution queue and the second-type instruction of the second entry from the second execution queue are mutually exclusive dispatched to the shared functional unit, a first-type issue unit, issuing the first-type instruction of each first entry to the first execution queue, scheduling read time and write time of the first-type instruction of each first entry, and setting the first count value recorded in each first entry of the first execution queue, and a second-type issue unit, issuing the second-type instruction of each second entry to the second execution queue, and scheduling read time and write time of the second-type instruction of each second entry, and setting the second count value recorded in each second entry of the second execution queue.

* * * * *